(12) United States Patent
Nakajima et al.

(10) Patent No.: US 9,467,244 B2
(45) Date of Patent: Oct. 11, 2016

(54) TRANSMISSION APPARATUS AND TRANSMISSION SYSTEM

(71) Applicant: FUJITSU LIMITED, Kawasaki-shi, Kanagawa (JP)

(72) Inventors: Ichiro Nakajima, Koto (JP); Kazuaki Nagamine, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/573,799

(22) Filed: Dec. 17, 2014

(65) Prior Publication Data
US 2015/0207583 A1    Jul. 23, 2015

(30) Foreign Application Priority Data
Jan. 21, 2014 (JP) ................................ 2014-009012

(51) Int. Cl.
*H04J 14/02* (2006.01)

(52) U.S. Cl.
CPC ........ *H04J 14/0212* (2013.01); *H04J 14/0209* (2013.01)

(58) Field of Classification Search
USPC ......................................................... 398/79
See application file for complete search history.

(56) References Cited

U.S. PATENT DOCUMENTS

2002/0003639 A1*  1/2002  Arecco .................. H04J 14/022
                                                                398/59
2010/0322633 A1* 12/2010  Suzuki ................ H04B 10/2942
                                                                398/93
2012/0183294 A1*  7/2012  Boertjes .............. H04J 14/0204
                                                                398/49
2012/0237212 A1   9/2012  Nishihara et al.

FOREIGN PATENT DOCUMENTS

JP       2011-259381       12/2011
JP       2012-195787       10/2012

OTHER PUBLICATIONS

Kyosuke Sone, et al., "First Demonstration of Hitless Spectrum Defragmentation using Real-time Coherent Receivers in Flexible Grid Optical Networks", ECOC 2012, Sep. 2012.

(Continued)

*Primary Examiner* — David Payne
*Assistant Examiner* — Omar S Ismail
(74) *Attorney, Agent, or Firm* — Staas & Halsey LLP

(57) ABSTRACT

A transmission apparatus includes: a first output unit configured to generate a first optical signal of which a first wavelength is variable and control the first wavelength to be close to a second wavelength of a second optical signal transmitted as a multiplexed optical signal with the first optical signal, the first output unit outputting the first optical signal to another transmission apparatus; and a second output unit configured to generate a third optical signal that is replication of the first optical signal in a wavelength band opposite to the first wavelength across the second wavelength, the second output unit outputting the third optical signal to the another transmission apparatus, wherein the first output unit stops outputting the first optical signal when the another transmission apparatus switches an optical signal to be received from the first optical signal to the third optical signal.

8 Claims, 19 Drawing Sheets

(56) References Cited

OTHER PUBLICATIONS

Masahiko Jinno, et al., "Distance-Adaptive Spectrum Resource Allocation in Spectrum-Sliced Elastic Optical Path Network", Topics in Optical Communications, IEEE Communications Magazine, pp. 138-145, Aug. 2010.

F. Cugini, et al., "Push-Pull Technique for Defragmentation in Flexible Optical Networks", OFC/NFOEC Technical Digest 2012 OSA, Mar. 2012.

* cited by examiner

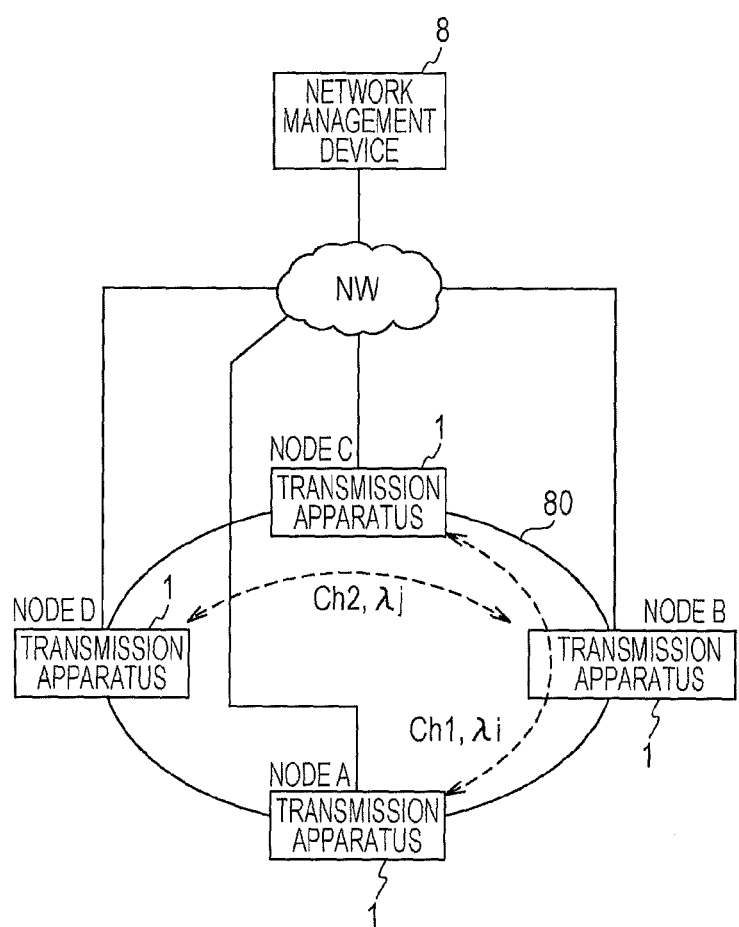

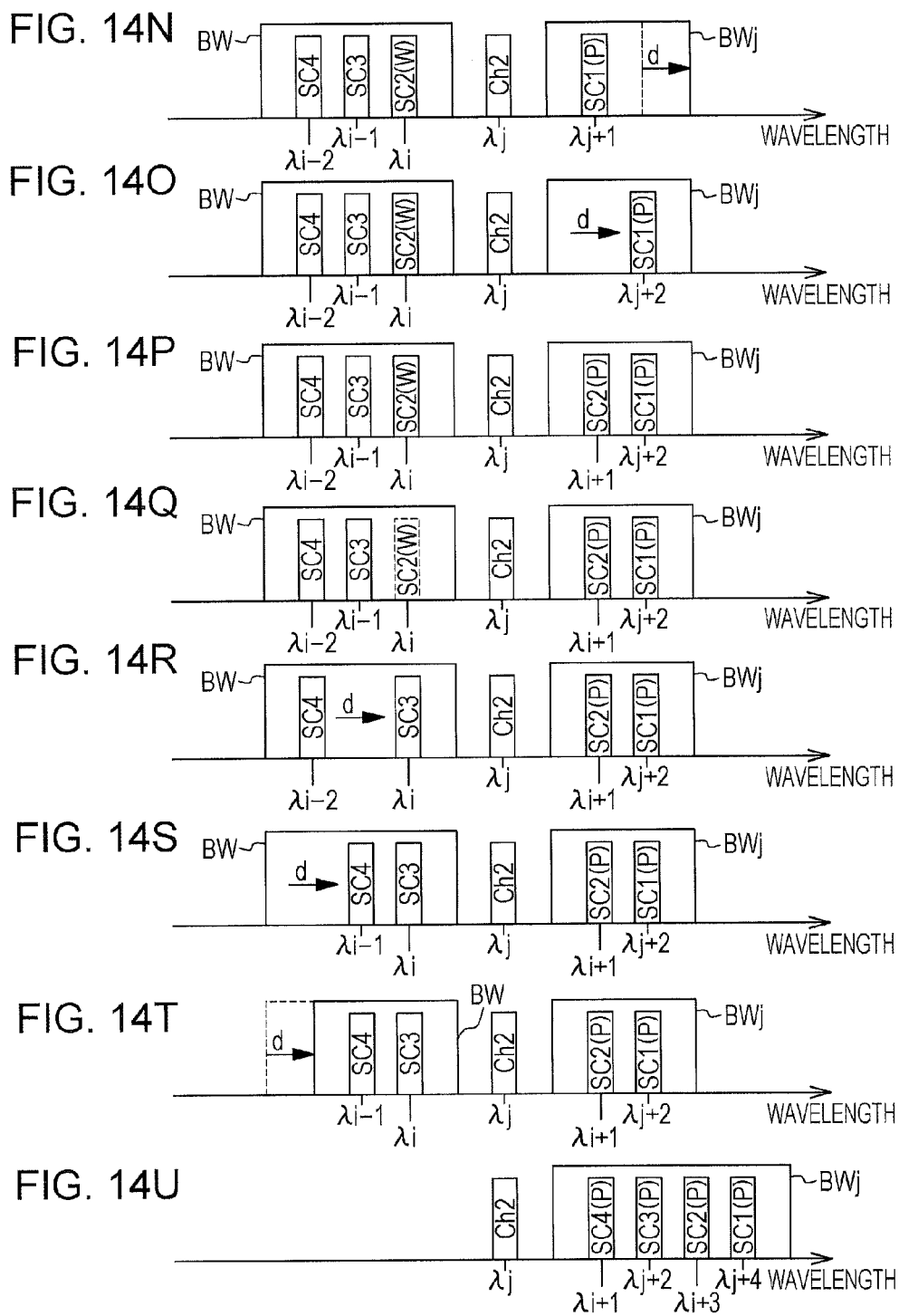

TRANSMISSION APPARATUS AND TRANSMISSION SYSTEM

CROSS-REFERENCE TO RELATED APPLICATION

This application is based upon and claims the benefit of priority of the prior Japanese Patent Application No. 2014-009012, filed on Jan. 21, 2014, the entire contents of which are incorporated herein by reference.

FIELD

The embodiments discussed herein are related to a transmission apparatus and a transmission system.

BACKGROUND

Along with communication demand increases, an optical network utilizing a wavelength division multiplexing (WDM) is widely used. The wavelength division multiplexing is a technology for transmitting by multiplexing a plurality of optical signals having different wavelengths.

According to the wavelength division multiplexing, for example, the optical signal of a transmission rate of 40 (Gbps)×88 waves is multiplexed and is capable of transmitting as a wavelength multiplexed optical signal (hereinafter, referred to as "multiplexed optical signal"). As a wavelength multiplexing transmission apparatus utilizing the WDM, for example, a Reconfigurable Optical Add-Drop Multiplexer (ROADM) apparatus is known.

About a spectrum of the multiplexed optical signal, the optical signal has a certain wavelength interval (wavelength spacing) such as 50 (GHz) or 100 (GHz). The wavelength interval is referred to as an ITU-T grid (ITU-T: International Telecommunication Union Telecommunication Standardization Sector (International Telecommunication Union)) and the like, and is widely used for the wavelength multiplexing transmission apparatus.

In the related art, as future demand for communications is expected to be increased, a multi-value modulation system such as Dual Polarization (DP)-Quaternary Phase-Shift Keying (QPSK) used for wireless communication is applied to the wavelength multiplexing transmission apparatus and coherent transmission is attempted to be realized. Thus, in the wavelength multiplexing transmission apparatus, it is preferable that the optical signals having various communication capacities different in the modulation system as well as the transmission rate be accommodated in the multiplexed optical signal.

Thus, a flexible grid technology in which the optical signals having various bandwidths are flexibly accommodated in the multiplexed optical signal by varying the wavelength interval is developed. For example, the flexible grid technology is defined in the ITU-T recommendation G. 694. 1. According to the flexible grid technology, different from a case where a fixed wavelength interval such as the ITU-T grid is used, it is possible to set the wavelength interval between the optical signals in which the spectrum is adjacent based on the minimum bandwidth depending on the type of the optical signal. Thus, the transmission capacity for each optical fiber increases and wavelength accommodation efficiency is improved.

However, for example, if the optical signal during operation is replaced with another optical signal having a different bandwidth, an unused fragmentation area occurs between the spectra of adjacent optical signals by a difference in passband widths of the optical signal before and after the replacement. Thus, there is a problem in that the wavelength accommodation efficiency of the optical fiber is decreased by increasing in the fragmentation area as the replacement of the optical signal progresses.

Meanwhile, for example, in Kyosuke Sone, et al. "First Demonstration of Hitless Spectrum Defragmentation using Real-time Coherent Receivers in Flexible Grid Optical Networks", ECOC 2012 and in F. Cugini, et al. "Push-Pull Technique for Defragmentation in Flexible Optical Networks", JTh2A, OFC2012, an uninterrupted defragmentation technology is disclosed in which the fragmentation area is reduced by synchronizing a wavelength of wavelength variable laser of a transmission node with a passband of a wavelength filter of a relay node to be changed.

Furthermore, about wavelength control of the optical signal, for example, in Japanese Laid-open Patent Publication No. 2012-195787, a configuration is disclosed in which the wavelength is arranged such that the optical signals having the same modulation system are adjacent to each other.

SUMMARY

According to an aspect of the invention, a transmission apparatus includes: a first output unit configured to generate a first optical signal of which a first wavelength is variable and control the first wavelength to be close to a second wavelength of a second optical signal transmitted as a multiplexed optical signal with the first optical signal, the first output unit outputting the first optical signal to another transmission apparatus; and a second output unit configured to generate a third optical signal that is replication of the first optical signal in a wavelength band opposite to the first wavelength across the second wavelength, the second output unit outputting the third optical signal to the another transmission apparatus, wherein the first output unit stops outputting the first optical signal when the another transmission apparatus switches an optical signal to be received from the first optical signal to the third optical signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a configuration view illustrating a configuration of a transmission system according to an embodiment;

DESCRIPTION OF EMBODIMENTS

When utilizing an uninterrupted defragmentation technology, control is performed with respect to each wavelength multiplexing transmission apparatus provided in a transmission node of a transmission source of an optical signal, a relay node relaying the optical signal, and a reception node receiving the optical signal. In the control, for example, a series of a sequence process is performed as described below.

First, a passband of a wavelength filter of a wavelength selective switch (WSS) of the transmission node and each relay node is extended by a predetermined amount. Next, a wavelength a wavelength variable laser diode (transmission device) of the transmission node is shifted (changed) by a small amount (for example, by 2.5 (GHz)) in the extended passband. Next, a wavelength of local light used for a receiving device of the reception node is shifted. Then, the passband of the wavelength selective switch of each relay node is reduced by a predetermined amount.

The wavelength of the optical signal in operation is changed to a predetermined target value by repeating the sequence process without causing interruption of the optical signal. Thus, since an interval between spectra is optimized, a fragmentation area occurring between the spectra of adjacent optical signals by a difference in passband widths of the optical signals is reduced and wavelength accommodation efficiency is improved.

However, in the sequence process described above, when the wavelength of the wavelength variable laser shifts and overlaps with the wavelength of another optical signal in operation, since crosstalk occurs between the optical signals, the optical signal is degraded. For example, if the other optical signal in operation is a signal of 100 (Gbps) modulated by DP-QPSK, when a frequency interval between the optical signals is narrower than 50 (GHz) in characteristics of the spectrum, the crosstalk occurs.

Thus, the wavelength of the wavelength variable laser may not be shifted beyond the wavelength of the other optical signal in operation and a value in the vicinity of the wavelength has to be set to a target value so that the frequency interval described above is secured. Therefore, the wavelength accommodation efficiency may not be sufficiently improved.

Hereinafter, a transmission apparatus and a transmission system capable of effectively improving the wavelength accommodation efficiency will be described.

Figure 1:
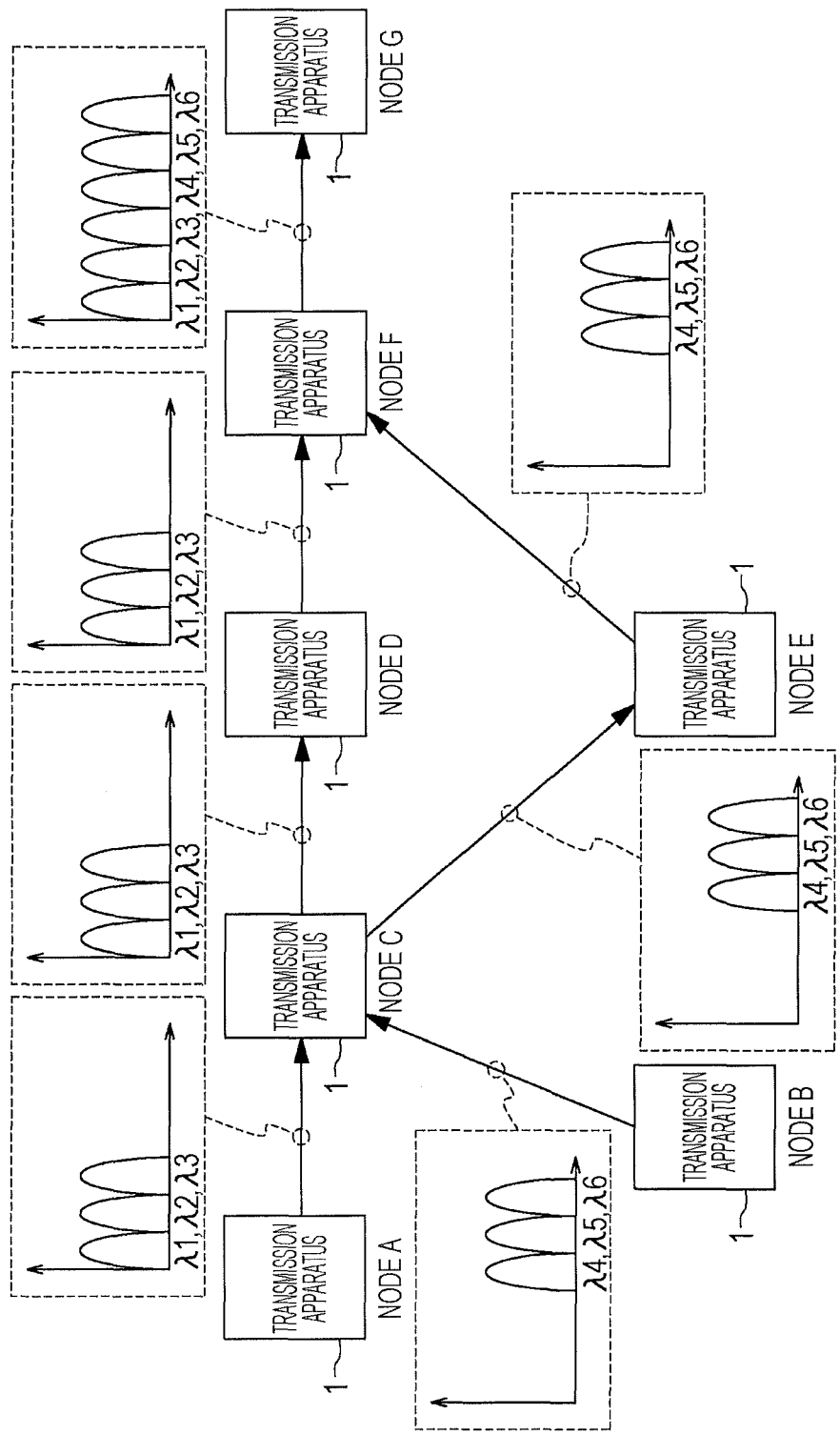
FIG. 1 is a configuration view illustrating a configuration example of a network.

FIG. 1 is a configuration view illustrating a configuration example of a network. The network has a plurality of nodes A to G. Each of the nodes A to G is provided with a transmission apparatus 1. For example, the transmission apparatus 1 is a wavelength multiplexing transmission apparatus such as a ROADM apparatus and transmits a plurality of optical signals in which wavelengths $\lambda 1$ to $\lambda 6$ are different as multiplexed optical signals by multiplexing the plurality of optical signals.

The transmission apparatus 1 of each of the nodes A to G is connected to the others through transmission lines (optical fiber). In FIG. 1, a graph illustrated by a dotted line drawn for each transmission line is the waveform of the spectrum of the multiplexed optical signal that is transmitted in the transmission line.

The multiplexed optical signal including the optical signals of the wavelengths $\lambda 1$ to $\lambda 3$ is transmitted in the transmission line from the node A to the node F through the node C and the node D. The multiplexed optical signal including the optical signals of the wavelengths $\lambda 4$ to $\lambda 6$ is transmitted in the transmission line from the node B to the node F through the node C and the node E. The transmission apparatus 1 of the node F transmits the multiplexed optical signal through two transmission lines described above to the transmission apparatus 1 of the node G as one multiplexed optical signal. Thus, the multiplexed optical signal in which the optical signals of the wavelengths $\lambda 1$ to $\lambda 6$ are multiplexed is transmitted in the transmission line between the nodes F and G.

As described above, the optical signals of arbitrary wavelengths $\lambda 1$ to $\lambda 6$ are transmitted between arbitrary nodes A to G by the network of the wavelength multiplexing transmission apparatus. Therefore, in the network, the transmission capacity increases as the wavelength accommodation efficiency of each transmission line increases.

Figure 2A:
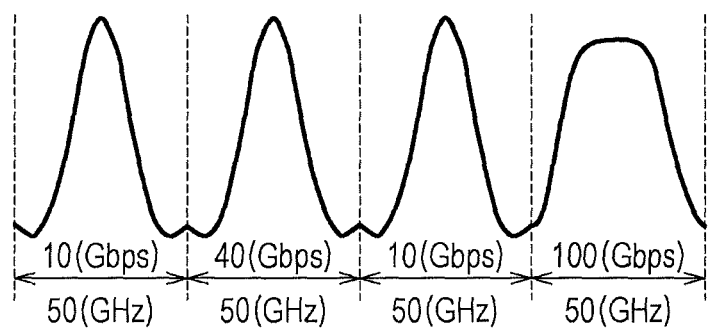
FIGS. 2A and 2B are waveform views illustrating respectively an example of a spectrum waveform of a multiplexed optical signal when employing an ITU-T grid and a flexible grid.
Figure 2B:
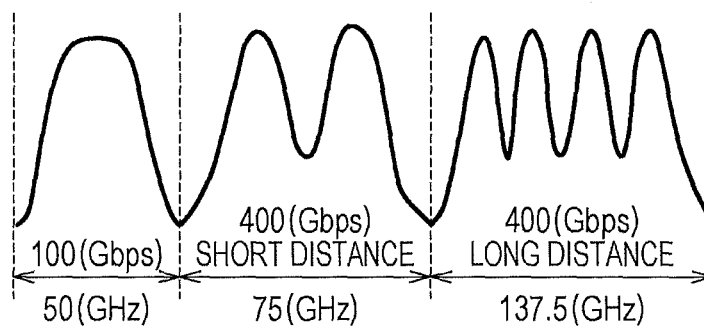

FIGS. 2A and 2B are waveform views illustrating respectively an example of a spectrum waveform of a multiplexed optical signal when employing an ITU-T grid and a flexible grid. In a case of the ITU-T grid illustrated in FIG. 2A, four optical signals in which the transmission rates are, for example, 10 (Gbps), 40 (Gbps), 10 (Gbps), and 100 (Gbps) are accommodated at the same wavelength interval (50 (GHz)). That is, each optical signal is assigned by a certain passband (50 (GHz)).

In contrast, in a case of the flexible grid illustrated in FIG. 2B, the wavelength intervals between the optical signals are not certain. For example, the optical signals in which the transmission rates are 100 (Gbps) of 400 (GHz) (for short distance) and 400 (GHz) (for long distance) are assigned by the passband of 50 (GHz), 75 (GHz), and 137.5 (GHz).

As described above, when employing the flexible grid, it is possible to flexibly set the wavelength interval of the optical signal (adjacent channel) in which the spectra are adjacent to the minimum wavelength band depending on the transmission rate of the optical signal without being certain.

Therefore, according to the flexible grid technology, it is possible to improve the waveform utilization efficiency for each optical fiber.

However, for example, if the optical signal in operation is replaced with another optical signal of which the bandwidth is different, an unused fragmentation area occurs between the spectra of adjacent optical signals by a difference in the bandwidth before and after the replacement. Thus, as the replacement of the optical signal progresses, there is a problem that the wavelength accommodation efficiency of the optical fiber is decreased by increasing the fragmentation area.

Figure 3A:
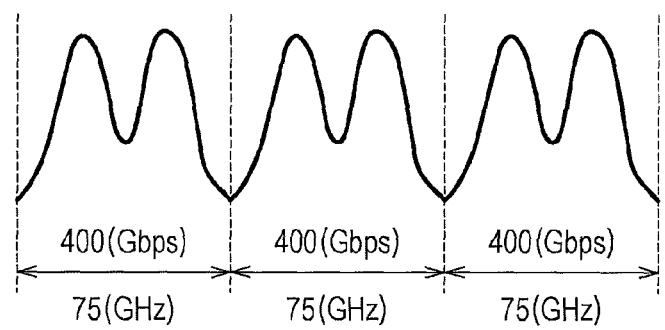
FIGS. 3A and 3B are waveform views illustrating respectively a shape of occurrence of a fragmentation area by replacement of an optical signal.
Figure 3B:
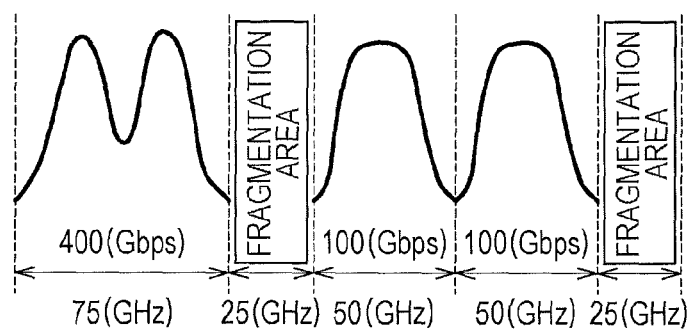

FIGS. 3A and 3B are waveform views illustrating respectively a shape of occurrence of the fragmentation area by replacement of the optical signal. Before the optical signal is replaced, for example, as illustrated in FIG. 3A, three optical signals of 400 (Gbps) are accommodated by being adjacent to each other. Here, the passband of each optical signal is 75 (GHz).

For example, as illustrated in FIG. 3B, two adjacent optical signals of three optical signals are replaced with the optical signals of 100 (Gbps). If the passband of the optical signal (100 (Gbps)) after the replacement is 50 (GHz), the fragmentation area having the bandwidth of 25 (GHz) occurs because of the difference in the bandwidth before and after the replacement. Thus, as the replacement of the optical signal progresses, there is a problem that the wavelength accommodation efficiency of the optical fiber is decreased by increasing the fragmentation area.

In contrast, it is possible to decrease the fragmentation area by controlling the wavelength and the passband of the optical signal using the uninterrupted defragmentation technology.

However, in the defragmentation process, if the wavelength of the wavelength variable laser is shifted and overlaps with the wavelength of another optical signal in operation, since the crosstalk occurs between the optical signals, the optical signal is degraded. Thus, as described below, the wavelength of the wavelength variable laser may not be shifted beyond the wavelength of the other optical signal in operation and a value in the vicinity of the wavelength has to be set to a target value so that the frequency interval described above is secured.

FIG. 4 is a configuration view illustrating a configuration of a transmission system according to an embodiment. The transmission system has a plurality of transmission apparatuses 1 and a network management device (network management system (NMS)) 8.

Transmission apparatuses 1 are respectively provided in the nodes A to D and are connected to each other through the optical fiber (transmission line). For example, each transmission apparatus 1 configures a ring type network 80. Moreover, in the example, the shape of the network 80 is the ring type, but the network 80 is not limited to the example and may be a mesh type.

The network management device 8 manages each transmission apparatus 1 inside the network 80. The network management device 8 is connected to each transmission apparatus 1 through a monitor control network NW such as a Local Area Network (LAN).

The transmission apparatus 1 transmits a plurality of optical signals of which the wavelengths are different by wavelength multiplexing the plurality of optical signals as the multiplexed optical signals. The network management device 8 manages the optical signal that is transmitted between the transmission apparatuses 1 of arbitrary nodes A to D by assigning the channel for each wavelength of the optical signal. As one example, the network management device 8 assigns a channel number of Ch1 to the optical signal of a wavelength $\lambda i$ that is transmitted between the transmission apparatuses 1 of the nodes A to C, and a channel number of Ch2 to the optical signal of a wavelength $\lambda j$ that is transmitted between the transmission apparatuses 1 of the nodes B and D.

The network management device 8 performs wavelength setting in the transmission apparatus 1 for each of channels Ch1 and Ch2. The wavelength setting is performed in the transmission apparatus 1 of the node A so that the optical signal of wavelength $\lambda i$ is inserted and is transmitted to the adjacent node B. The wavelength setting is performed in the transmission apparatus 1 of the node B so that the optical signal of wavelength $\lambda i$ passes and is transmitted to the adjacent node C. The wavelength setting is performed in the transmission apparatus 1 of the node B so that the optical signal of wavelength $\lambda j$ is inserted and is transmitted to the adjacent node C.

The wavelength setting is performed in the transmission apparatus 1 of the node C so that the optical signal of wavelength $\lambda j$ passes and is transmitted to the adjacent node D. In addition, the wavelength setting is performed in the transmission apparatus 1 of the node C so that the optical signal of the wavelength $\lambda i$ is branched and is transmitted to another network. The wavelength setting is performed in the transmission apparatus 1 of the node D so that the optical signal of wavelength $\lambda j$ is branched and is transmitted to another network.

Comparative Example

First, a comparative example as one example for comparing with the embodiment of this application is illustrated. In the network illustrated in FIG. 4, it is assumed that the fragmentation area exists between the wavelengths $\lambda i$ and $\lambda j$, and an example in which the defragmentation process of the optical signal of Ch1 is performed is described. FIGS. 5A to 5E are waveform views of the spectrum illustrating a process of a defragmentation process of the comparative example. Moreover, the wavelength $\lambda j$ is greater than the wavelength $\lambda i$.

Figure 5A:
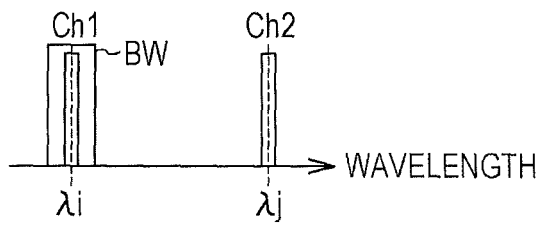
FIGS. 5A to 5E are waveform views of a spectrum illustrating a process of a defragmentation process of a comparative example.

FIG. 5A illustrates the spectrum of the optical signal of Ch1 and the optical signal of Ch2 in an initial state, that is, a state in which it is assumed that the fragmentation area exists between the wavelengths $\lambda i$ and $\lambda j$. The optical signals of Ch1 and Ch2 are transmitted as the multiplexed optical signals in the optical fiber between the node B and the node C. In addition, a symbol BW represents a passband of Ch1 that is set in a wavelength filter of a wavelength selection switch inside the transmission apparatus 1 of the node A.

Figure 5B:
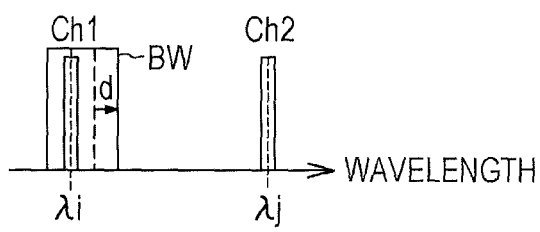

FIG. 5B illustrates a shape where the passband BW is extended. In the transmission apparatus 1 of the transmission node A, for example, the passband BW is extended to a long wavelength side (symbol d) by the minimum slot width. In addition, the extension of the passband BW is also similarly performed in the wavelength filter of the wavelength selection switch inside the transmission apparatus 1 of the relay node B.

Figure 5C:
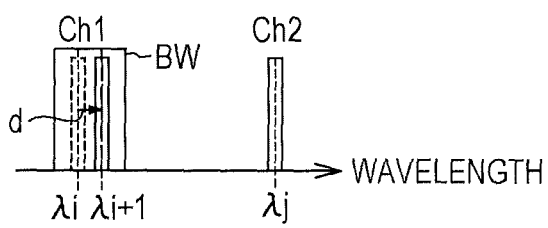

FIG. 5C illustrates a shape where the wavelength of the optical signal of Ch1 is changed (shifted) from $\lambda i$ to $\lambda i+1$. The wavelength of the optical signal of Ch1 is changed to the long wavelength side (symbol d). For example, an amount $\lambda i+1-\lambda i$ of change is an amount (for example, 2.5 (GHz) or less in terms of frequency) of an extent in which penalty (that is, bit error and the like) of the optical signal of Ch1 does not occur in the transmission apparatus 1 of the reception node C. Furthermore, the wavelength of the local light of a reception device receiving the optical signal of Ch1 is also changed in the transmission apparatus 1 of the reception node C.

Figure 5D:
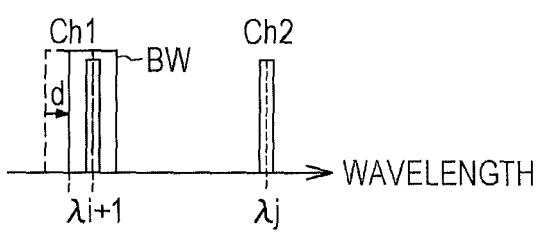

FIG. 5D illustrates a shape where the passband BW is reduced. In the transmission apparatus 1 of the transmission node A, for example, the passband BW is reduced to the long wavelength side (symbol d) by the minimum slot width. In addition, the reduction of the passband BW is also similarly performed in the wavelength filter of the wavelength selection switch inside the transmission apparatus 1 of the relay node B.

The process of FIGS. 5B to 5D is repeated until the wavelength of the optical signal of Ch1 becomes the target value. However, if the target value exists on the long wavelength side of the wavelength $\lambda j$ of the optical signal of Ch2, in order to avoid influence of the crosstalk occurring by overlapping the spectra of the optical signals of Ch1 and Ch2, the wavelength of the optical signal of Ch1 is limited to a short wavelength side of the wavelength $\lambda j$. That is, the wavelength of the optical signal of Ch1 may not exceed the wavelength $\lambda j$ of the optical signal of Ch2.

Figure 5E:
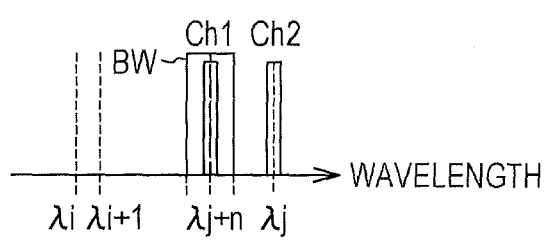

FIG. 5E illustrates a state where the defragmentation process is completed. The wavelength of the optical signal of Ch1 remains in $\lambda i+n$ on the short wavelength side of the wavelength of the optical signal of Ch2. The wavelength $\lambda i+n$ is, for example, a value closest to the wavelength $\lambda j$ of the optical signal of Ch2 within a range in which the crosstalk between the optical signals of Ch1 and Ch2 does not affect transmission characteristics of each optical signal.

As described above, according to the comparative example, the fragmentation area between the wavelengths $\lambda i$ and $\lambda j$ is reduced, but since the wavelength $\lambda i$ of the optical signal of Ch1 may not be changed to the long wavelength side of the wavelength $\lambda j$ of the optical signal of Ch2, the fragmentation area that is on the long wavelength side of the wavelength $\lambda j$ may not be reduced.

Figure 6A:
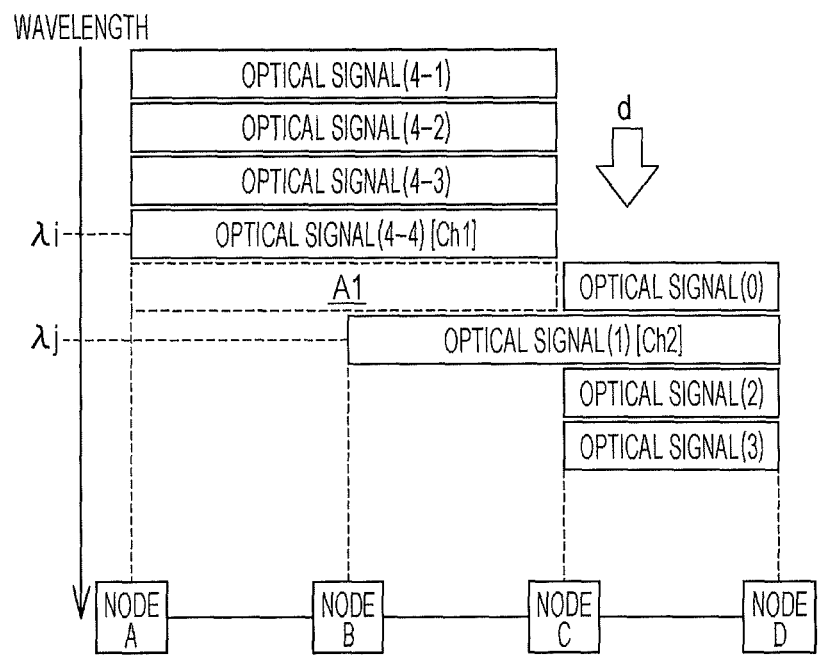
FIGS. 6A and 6B are arrangement views illustrating a wavelength arrangement between nodes before and after the defragmentation process in the comparative example.
Figure 6B:
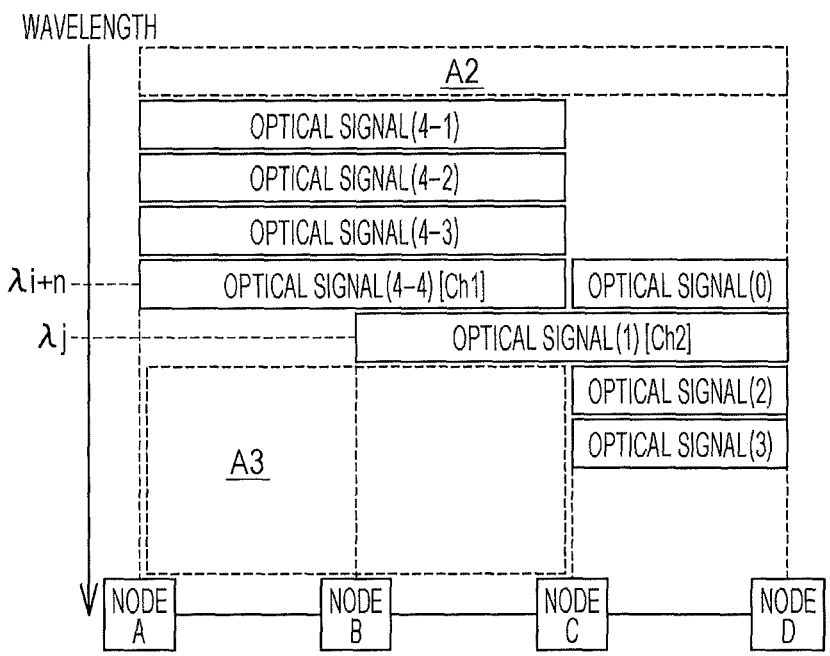

FIGS. 6A and 6B are arrangement views illustrating a wavelength arrangement between nodes A to D before and after the defragmentation process in the comparative example. FIG. 6A illustrates one example of the wavelength arrangement of the optical signal before the defragmentation process. FIG. 6B illustrates one example of the wavelength arrangement of the optical signal after the defragmentation process.

Before the defragmentation process, optical signals (4-1) to (4-4) in which the wavelength spectra are adjacent are transmitted between the nodes A to C and an optical signal (1) is transmitted between the nodes B and D. Furthermore, optical signals (0), (2), and (3) are transmitted between the nodes C and D. The wavelength spectra of the optical signals (0) to (3) are adjacent. Here, the optical signal (4-4) corresponds to the optical signal of Ch1 (wavelength $\lambda i$) and the optical signal (1) corresponds to the optical signal of Ch2 (wavelength $\lambda j$).

In the wavelength arrangement, a fragmentation area A1 exists between the wavelengths $\lambda i$ and $\lambda j$ from the node A to the node C. Thus, the wavelength $\lambda i$ of the optical signal (4-4) is shifted to the long wavelength side by the defragmentation process illustrated in FIGS. 5A to 5E and thereby the fragmentation area A1 is deleted. Furthermore, other optical signals (4-1) to (4-3) are also shifted to the long wavelength side by the similar defragmentation process.

Therefore, the wavelength of the optical signal (4-4) is changed to $\lambda i+n$ adjacent to the short wavelength side of the optical signal (1). Since the wavelengths of other optical signals (4-1) to (4-3) are also changed depending on the wavelength $\lambda i+n$ after change in the optical signal (4-4), the fragmentation area A1 is deleted and a free area A2 is secured on the short wavelength side of the wavelength of the optical signal (4-1) throughout the nodes A to D.

However, in order to avoid influence of the crosstalk, since the wavelength of the optical signal of Ch1 may not exceed the wavelength $\lambda j$ of the optical signal of Ch2, a fragmentation area A3 existing on the long wavelength side of the wavelength $\lambda j$ of the optical signal (1) throughout the nodes A to C may not be deleted. Therefore, in the defragmentation process of the comparative example, since the target value of the wavelength of the optical signal (4-4) has to be a value in the vicinity of the wavelength $\lambda j$ of the optical signal (1), the wavelength accommodation efficiency may not be sufficiently improved.

Embodiment

The transmission apparatus 1 according to the embodiment causes the wavelength of the first optical signal that is the target of the defragmentation process to be close to the wavelength of the second optical signal that is transmitted as the multiplexed optical signal with the first optical signal on the transmission line, generates an optical signal that is the replication of the first optical signal in a wavelength band opposite to the first optical signal across the second optical signal, and then deletes the first optical signal. Thus, since the wavelength of the first optical signal can be shifted beyond the wavelength of the second optical signal, the wavelength accommodation efficiency is effectively improved.

Figure 7:
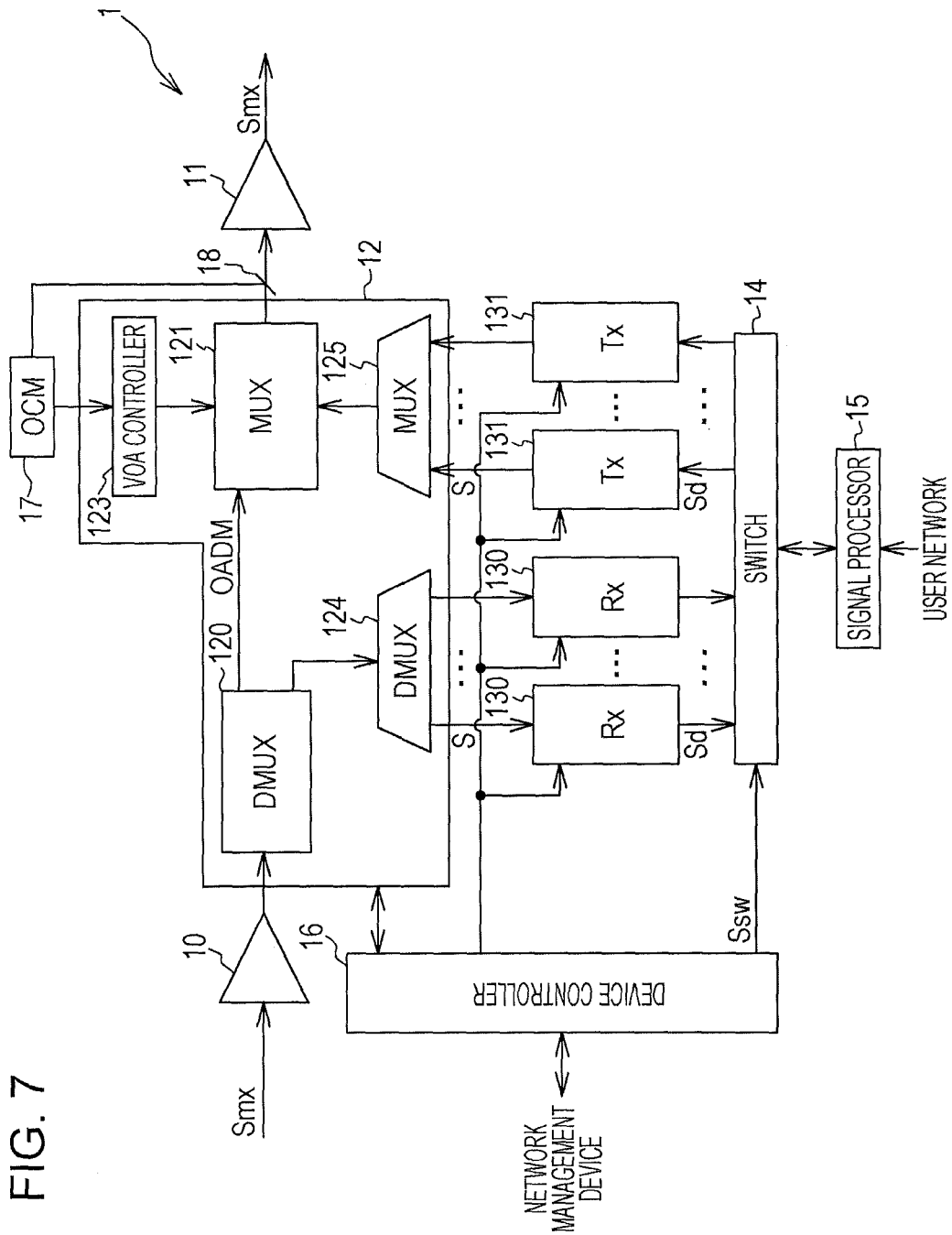
FIG. 7 is a configuration view illustrating a functional configuration of a transmission apparatus according to an embodiment.

FIG. 7 is a configuration view illustrating a functional configuration of the transmission apparatus 1 according to the embodiment. The transmission apparatus 1 has an input-side amplifier 10, an output-side amplifier 11, and an optical add-drop multiplexer (OADM) 12. The transmission apparatus 1 further has a plurality of receivers (Rxs) 130, a plurality of transmitters (Txs) (first and second output units) 131, a switch 14, a signal processor 15, a device controller 16, an optical channel monitor (OCM) 17, and an optical splitter 18.

The input-side amplifier 10 amplifies a multiplexed optical signal Smx input from another transmission apparatus 1 and outputs the multiplexed optical signal Smx to the optical add-drop multiplexer 12. The optical add-drop multiplexer 12 outputs the optical signal that is a target of divergence from the multiplexed optical signal Smx input from the input-side amplifier 10 to the receivers 130.

Furthermore, the optical add-drop multiplexer 12 wavelength multiplexes the optical signal that is a target of insertion input from the transmitters 131 together with other optical signals and outputs the optical signal to the output-side amplifier 11 as the multiplexed optical signal Smx. The output-side amplifier 11 amplifies the multiplexed optical signal Smx input from the optical add-drop multiplexer 12 and outputs the multiplexed optical signal Smx to the transmission apparatus 1 of another node.

The receiver 130 and the transmitter 131 are a transceiver referred to as a transponder and the like and may be configured as a device independent from each other, and may be configured as an integrated device. The transmitter 131 generates an optical signal S that is a target of the insertion based on an electrical data signal Sd input from the switch 14 and outputs the optical signal S to the optical add-drop multiplexer 12.

Figure 8:
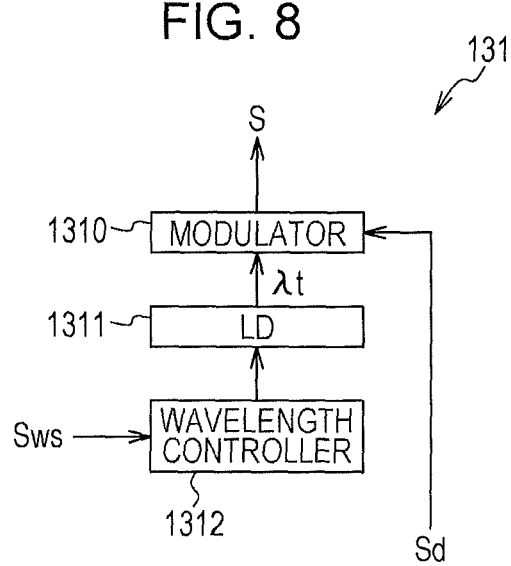
FIG. 8 is a configuration view illustrating one example of a functional configuration of a transmitter.

FIG. 8 is a configuration view illustrating one example of a functional configuration of the transmitter 131. The transmitter 131 has a modulator 1310, a wavelength variable laser diode (LD) 1311 which is a light source, and a wavelength controller 1312.

The wavelength variable laser diode 1311 outputs the light of which the wavelength is variable. The wavelength controller 1312 controls a wavelength λt of the light output from the wavelength variable laser diode 1311 according to a transmission wavelength control signal Sws input from the device controller 16. The wavelength controller 1312 changes the wavelength of the optical signal S in the defragmentation process.

The modulator 1310 modulates the light output from the wavelength variable laser diode 1311 based on the data signal Sd. As a modulation system, for example, DP-QPSK may be exemplified, but the modulation system is not limited to the example. The modulator 1310 outputs the optical signal S generated by a modulation process to the optical add-drop multiplexer 12. As described above, the transmitter 131 converts the electrical data signal Sd into the optical signal S.

Meanwhile, the receiver 130 receives the optical signal S of the target of divergence input from the optical add-drop multiplexer 12, generates the electrical data signal Sd based on the optical signal S, and outputs the electrical data signal Sd to the switch 14.

Figure 9:
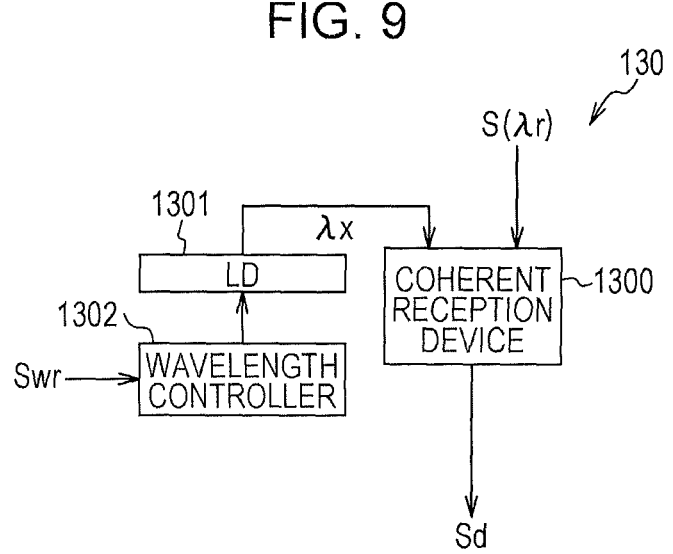
FIG. 9 is a configuration view illustrating one example of a functional configuration of a receiver.

FIG. 9 is a configuration view illustrating one example of a functional configuration of the receiver 130. The receiver 130 has a coherent reception device 1300, a wavelength variable laser diode 1301, and a wavelength controller 1302.

The wavelength controller 1302 controls a wavelength λx of the light output from the wavelength variable laser diode 1301 according to a reception wavelength control signal Swr input from the device controller 16.

The coherent reception device 1300 uses the light output from the wavelength variable laser diode 1301 as the local light and, for example, detects the optical signal S by heterodyne detection, and performs a demodulation process. The wavelength controller 1302 changes the wavelength λx of the local light so that the penalty does not occur in the optical signal S when the wavelength λr of the optical signal S is changed in a defragmentation process.

The coherent reception device 1300 generates the electrical data signal Sd based on the detected optical signal S and outputs the electrical data signal Sd to the switch 14. As described above, the receiver 130 converts the optical signal S into the electrical data signal Sd.

For example, the data signal Sd is a client signal such as an Ethernet (registered trademark) frame. The data signal Sd is input from the user network to the signal processor 15. The signal processor 15 performs a frame conversion process of the data signal Sd and the like, and outputs the data signal Sd to the switch 14.

The switch 14 outputs the data signal Sd input from the signal processor 15 to the plurality of transmitters 131 according to a switch setting signal Ssw input from the device controller 16. Furthermore, the switch 14 selects the data signal Sd that is output to the signal processor 15 among the data signals Sd input from the plurality of receivers 130 according to the switch setting signal Ssw input from the device controller 16. The signal processor 15 performs a frame conversion process of the selected data signal Sd input from the selected receiver 130 and the like, and outputs the data signal Sd to the user network. Moreover, the switch 14 has a buffer that stores the data signal Sd, for example, by packet unit.

Furthermore, for example, the device controller 16 includes a processor such as a Central Processing Unit (CPU) and the like, communicates with the network management device 8, and controls an entirety of the transmission apparatus 1. The device controller 16 performs wavelength setting to the optical add-drop multiplexer 12, the receiver 130, and the transmitter 131, and performs setting of the switch 14 according to instruction of the network management device 8. Furthermore, the device controller 16 also performs the control of the defragmentation process according to the instruction of the network management device 8. Moreover, the defragmentation process is not limited to the example and may be performed autonomously by the transmission apparatus 1.

The optical add-drop multiplexer 12 has a demultiplexer 120, a multiplexer 121, a variable optical attenuation (VOA) controller 123, a demultiplexer (DMUX) 124, and a multiplexer (MUX) 125. For example, the demultiplexer 120 is an optical splitter, demultiplexes the multiplexed optical signals Smx, and respectively outputs the multiplexed optical signals Smx to the multiplexer 121 and the demultiplexer 124. For example, the demultiplexer 124 is an optical splitter or a wavelength selection switch and separates the multiplexed optical signal Smx into one or more wavelength-multiplexed optical signals S, and outputs the optical signal S to the receiver 130.

For example, the multiplexer 125 is an optical coupler or a wavelength selection switch and multiplexes the optical signals S input from the plurality of transmitters 131, and outputs the optical signal S to the multiplexer 121 as the multiplexed optical signal. For example, the multiplexer 121 is a wavelength selection switch. The multiplexer 121 multiplexes the multiplexed optical signal Smx input from the demultiplexer 120 and the optical signal of the wavelength selected from wavelengths of optical signals included in the multiplexed optical signals input from the multiplexer 125, and outputs the optical signal to the output-side amplifier 11 as a new multiplexed optical signal Smx. Moreover, the wavelength selected in the multiplexer 121 is set by the device controller 16.

Figure 10:
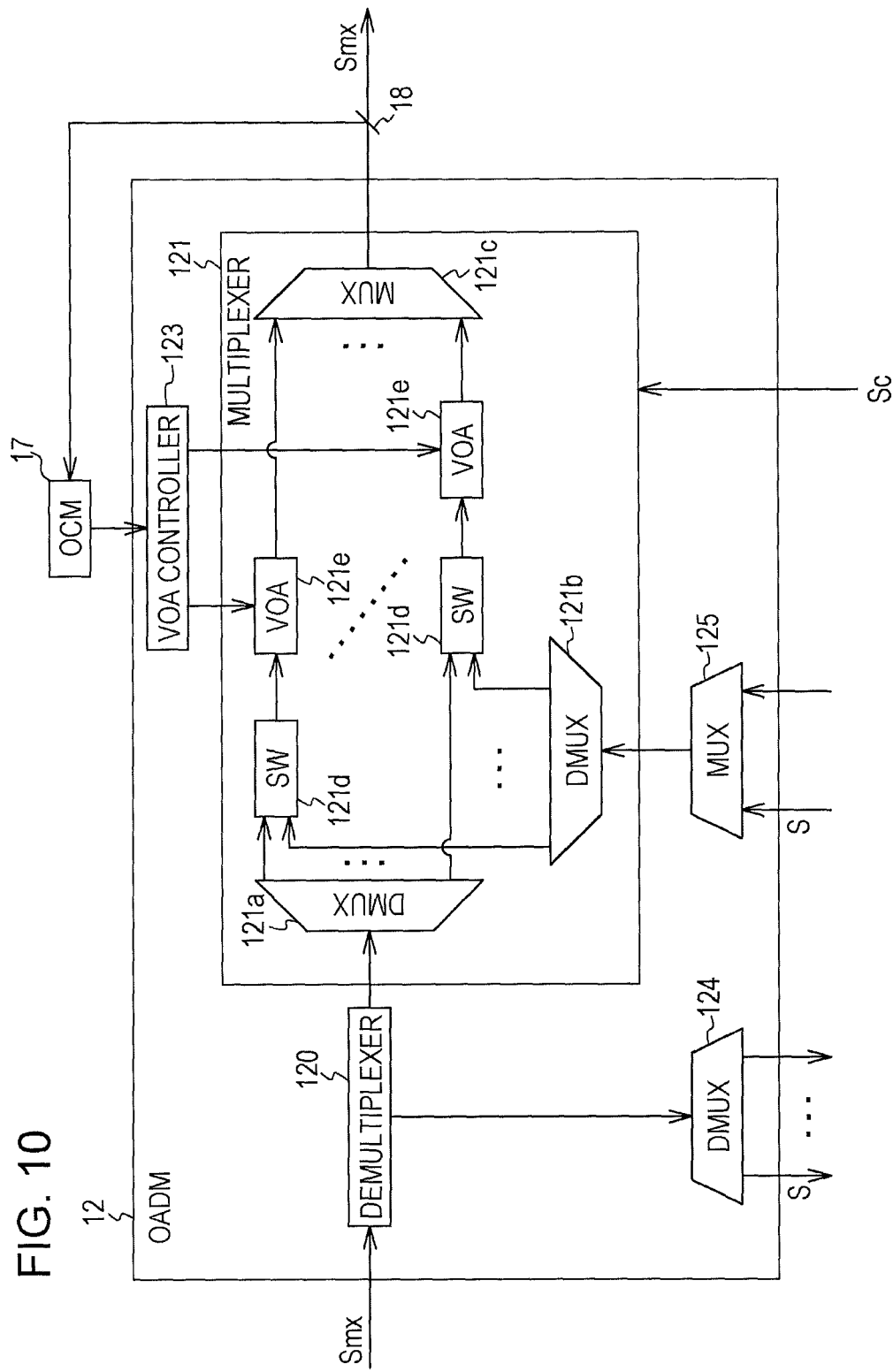
FIG. 10 is a configuration view illustrating one example of a functional configuration of a multiplexer.

FIG. 10 is a configuration view illustrating one example of a functional configuration of the multiplexer 121. More specifically, FIG. 10 is a block configuration view of the wavelength selection switch. The multiplexer 121 has a first DMUX 121a, a second DMUX 121b, a MUX 121c, a plurality of optical switches 121d, and a plurality of variable attenuators (VOA) 121e.

The first DMUX 121a separates the multiplexed optical signal Smx input from the demultiplexer 120 by wavelength unit and inputs obtained each optical signal into one of input terminals of each optical switch 121d. The second DMUX 121b separates the multiplexed optical signal input from the multiplexer 125 by wavelength unit and inputs each obtained optical signal into the other of the input terminals of each optical switch 121d.

The optical switch 121d is provided for each wavelength and selects one of the optical signals input into two input terminals, and outputs the optical signal to the variable attenuator 121e. The optical switch 121d selects the optical signal based on the wavelength setting from the device controller 16. That is, the optical switch 121d selects the optical signal input from the first DMUX 121a in the wavelength is passed setting and selects the optical signal input from the second DMUX 121b in the wavelength is inserted setting.

The variable attenuation 121e attenuates the optical signal by an amount of attenuation according to the control of the VOA controller 123 and outputs the optical signal to the MUX 121c. The MUX 121c wavelength multiplexes the optical signal input from each variable attenuator 121e and outputs the optical signal to the output-side amplifier 11 as the multiplexed optical signal Smx. A part of the multiplexed optical signal Smx output to the output-side amplifier 11 is input into the optical channel monitor 17 by being demultiplexed by optical splitter 18.

The optical channel monitor 17 detects power of the optical signal of each wavelength included in the multiplexed optical signal Smx and notifies the VOA controller 123 of power. The VOA controller 123 controls the amount of the attenuation of the variable attenuator 121e to an appropriate value based on power of the optical signal of each wavelength. That is, power of the optical signal of each wavelength included in the multiplexed optical signal Smx is feedback controlled.

The multiplexer 121 can change the passband of the optical signal by providing, for example, liquid crystal on silicon (LCOS) on the variable attenuator 121e. The LCOS has an electrode layer and a liquid crystal layer formed on a silicon substrate, and refractive index distribution is formed in each area of a reflecting surface on which the optical signal is reflected depending on an applied voltage.

Reflection characteristics of the LCOS are determined based on the refractive index distribution inside the reflecting surface and affect a width of a band through which the optical signal passes. Therefore, the LCOS functions as a wavelength filter capable of controlling the passband of the optical signal by pixel (slot) unit. In the defragmentation process, the passband of the optical signal is controlled by a band control signal Sc input from the device controller 16.

First Embodiment

Next, the defragmentation process of a first embodiment is described. The optical signal that is the target of the defragmentation process and other assumptions are similar to those of the comparative example.

First, the transmitter (first output unit) 131 of the transmission node A causes the wavelength of the optical signal (first optical signal) of Ch1 to be close to the wavelength $\lambda j$ of the optical signal (second optical signal) of Ch2. The process is similar to the description with reference to FIGS. 5A to 5E.

That is, as illustrated in FIG. 5B, the multiplexer 121 extends the passband BW of the optical signal of Ch1 to the long wavelength side. At this time, also in the transmission apparatus 1 of the relay node B, the multiplexer 121 extends the passband BW of the optical signal of Ch1 to the long wavelength side.

Next, as illustrated in FIG. 5C, in the transmission node A, the wavelength controller 1312 controls the wavelength variable laser diode 1311 and changes the wavelength of the optical signal of Ch1 to the long wavelength side. At this time, in the reception node C, the wavelength controller 1302 changes the wavelength $\lambda x$ of the local light depending on the change in the wavelength of the optical signal of Ch1.

Next, as illustrated in FIG. 5D, the multiplexer 121 reduces the passband BW of the optical signal of Ch1 to the long wavelength side. At this time, also in the transmission apparatus 1 of the relay node B, the multiplexer 121 reduces the passband BW of the optical signal of Ch1 to the long wavelength side.

The wavelength of the optical signal of Ch1 becomes the value of $\lambda i+n$ closest to the wavelength $\lambda j$ on the short wavelength side of the wavelength $\lambda j$ of the optical signal of Ch2 by repeating the process of FIGS. 5B to 5D. Hereinafter, the process thereafter will be described with reference to FIGS. 11A to 11F.

Figure 11A:
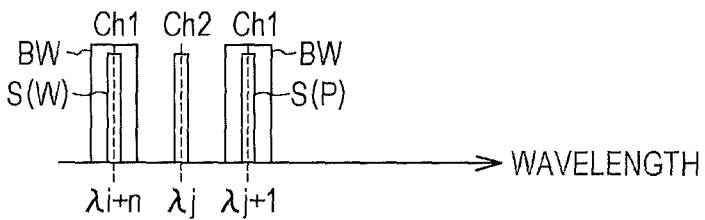
FIGS. 11A to 11F are views illustrating a process of a defragmentation process of a first embodiment.

FIGS. 11A to 11F are views illustrating the process of the defragmentation process of the first embodiment. FIG. 11A illustrates a shape where the optical signal S of Ch1 is replicated. Here, the optical signal of the replication source is referred to as "S(W)" and the optical signal that is obtained by replication is referred to as "S(P)".

In the transmission node A, the transmitter 131 for replication generates and outputs the optical signal S(P) (third optical signal) that is the replication of the optical signal S(W) of Ch1 in the wavelength band opposite to the optical signal S(W) across the optical signal of Ch2. For example, the wavelength $\lambda j+1$ of the optical signal S(P) for the replication is set to be the wavelength $\lambda j$ inside a range in which the crosstalk is allowed between the optical signal of Ch2 and the optical signal S(P) for replication, and within a range in which a buffer amount of the transmission apparatus 1 of the reception node C may be allowed, in the wavelength band on the long wavelength side of the wavelength $\lambda j$ of the optical signal of Ch2. Hereinafter, an operation when replicating will be described with reference to FIG. 12.

Figure 12:
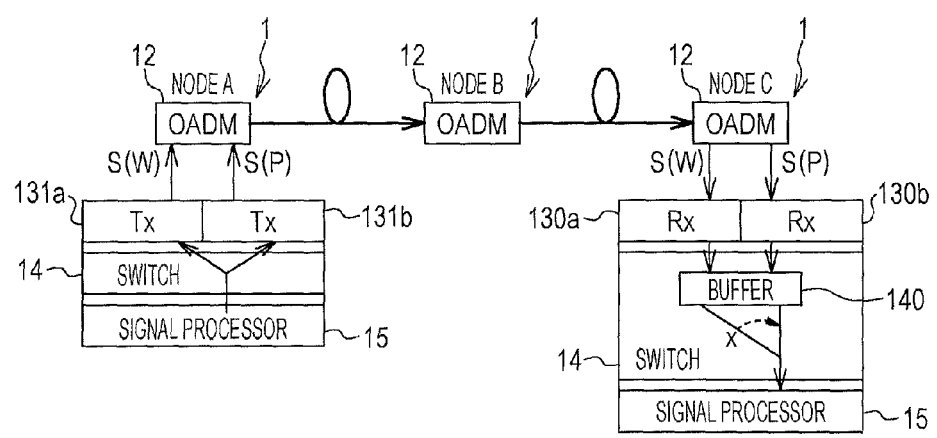
FIG. 12 is a configuration view illustrating an operation of each transmission apparatus of a transmission node and a reception node in a defragmentation process.

FIG. 12 is a configuration view illustrating the operation of each transmission apparatus (first transmission apparatus and second transmission apparatus) 1 of the transmission node A and the reception node C in the defragmentation process. A transmitter 131a for Ch1 outputting the optical signal S(W) of Ch1 and a transmitter 131b for the replication outputting the optical signal S(P) that is the replication of the optical signal of Ch1 among the plurality of the transmitters 131 of the transmission node A are illustrated in FIG. 12.

In the transmitter 131a for Ch1, the wavelength of the wavelength variable laser diode 1311 is $\lambda i+n$ and in the transmitter 131b for the replication, and the wavelength of the wavelength variable laser diode 1311 is $\lambda j+1$. The wavelength setting is performed with respect to each of the transmitters 131a and 131b from the device controller 16, based on the instruction of the network management device 8.

In addition, a receiver 130a for Ch1 receiving the optical signal S(W) of Ch1 and a receiver 130b for the replication receiving the optical signal S(P) that is the replication of the optical signal S(W) of Ch1 among the plurality of receivers 130 of the reception node C are illustrated in FIG. 12. In the receiver 130a for Ch1, the wavelength of the local light is set based on the wavelength $\lambda i+n$ of the optical signal S(W) of Ch1 and in the receiver 130b for the replication, the wavelength of the local light is set based on the wavelength $\lambda j+1$ of the optical signal S(P) for replication. The wavelength setting is performed with respect to each of receivers 130a and 130b from the device controller 16, based on the instruction of the network management device 8.

In the transmission node A, the switch 14 respectively distributes the data signal Sd input from the signal processor 15 to the transmitter 131a for Ch1 and the transmitter 131b for the replication among the plurality of the transmitters 131. The distribution setting is performed with respect to the switch 14 from the device controller 16, based on the instruction of the network management device 8.

Therefore, the transmitter 131a for Ch1 generates the optical signal S(W) of Ch1, based on the data signal Sd and the transmitter 131b for the replication generates the optical signal S(P) for the replication, based on the data signal Sd. That is, the optical signal S(W) of Ch1 and the optical signal S(P) for the replication are generated from the common data signal Sd.

As described above, the optical signal S(W) of Ch1 is easily replicated by performing the distribution setting in the switch 14. Moreover, the transmitter 131b for the replication may be used in applications other than the defragmentation process.

The optical signal S(W) of Ch1 and the optical signal S(P) for the replication are multiplexed by the optical add-drop multiplexer 12 and are input into the receiver 130 of the transmission apparatus 1 of the reception node C through the transmission apparatus 1 of the relay node B as the multiplexed optical signal Smx. Moreover, in the transmission apparatus 1 of the relay node B, the passed setting of the optical signal S(P) for the replication is performed and the optical signal of Ch2 is inserted, and the optical signal of Ch2 is added to the multiplexed optical signal Smx.

Meanwhile, in the reception node C, the receiver 130a for Ch1 receives the optical signal S(W) of Ch1 and the receiver 130b for the replication receives the optical signal S(P) for the replication. The receiver 130a for Ch1 generates the data signal Sd from the optical signal S(W) of Ch1 and the receiver 130b for the replication generates the data signal Sd from the optical signal S(P) for the replication.

Each of the data signals Sd output from the receivers 130a and 130b is stored in a buffer 140 inside the switch 14, for example, by packet unit. The switch 14 switches (see a symbol x) an output source of the data signal Sd output to the signal processor 15 from the receiver 130a for Ch1 to the receiver 130b for the replication, after a synchronizing process between the data signals Sd is performed. For example, the synchronizing process of the data signal Sd is performed by detecting the matching of contents of each data signal Sd stored in the buffer 140.

Thus, the signal processor 15 receives the data signal Sd obtained from the optical signal S(P) for the replication instead of the data signal Sd obtained from the optical signal S(W) of Ch1. The switching of the data signal Sd is performed without interruption because the synchronization between the data signals Sd is established.

Furthermore, since a difference in a delay amount between the optical signal S(W) of Ch1 and the optical signal S(P) for the replication is small, a capacity of the buffer 140 is small. This is because the transmitter 131a causes the wavelength of the optical signal S(W) of Ch1 to be close to the wavelength of the optical signal of Ch2 and thereby to reduce a wavelength difference between the optical signal S(W) of Ch1 and the optical signal S(P) for the replication in the transmission node A. Furthermore, for the same reason, since a difference in a dispersion compensation amount of the data signal Sd is reduced before and after the switching of the data signal Sd in the reception node C, a circuit scale is reduced.

As described above, the transmission apparatus 1 of the reception node C switches a target to be received (a target to be signal processed) from the optical signal S(W) of Ch1 to the optical signal S(P) for the replication after the optical signal S(P) for the replication is output from the transmission apparatus 1 of the transmission node A. Thus, each transmission apparatus 1 of the nodes A to C can perform the defragmentation process in which the wavelength of the optical signal S(P) for the replication is changed to the wavelength band beyond the wavelength of the optical signal of Ch2.

The switch 14 notifies the device controller 16 of the completion of the switching process. For example, the device controller 16 notifies the transmission apparatus 1 of the transmission node A through the network management device 8 of the completion of the switching process.

For example, the transmission apparatus 1 of the transmission node A deletes the optical signal S(W) of the replication source and uses the optical signal S(P) for the replication as the optical signal of Ch1 when receiving the notification of the completion of the switching process of the reception node C through the network management device 8.

Figure 11B:
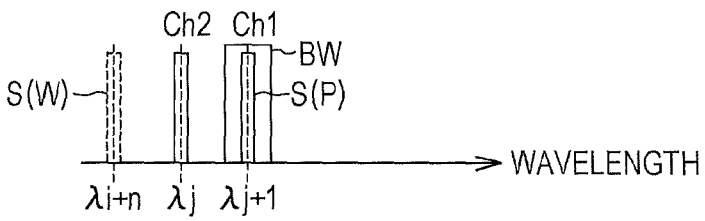

FIG. 11B illustrates a shape where deleting the optical signal S(W) of Ch1. At this time, the transmitter 131a for Ch1 stops the output of the optical signal S(W), after the optical signal S(P) for the replication is output from the transmitter 131b for the replication. Therefore, the optical signal S(W) of the replication source is deleted. Moreover, output stop control of the optical signal S(W) is performed by, for example, the device controller 16, based on the instruction of the network management device 8.

Figure 11C:
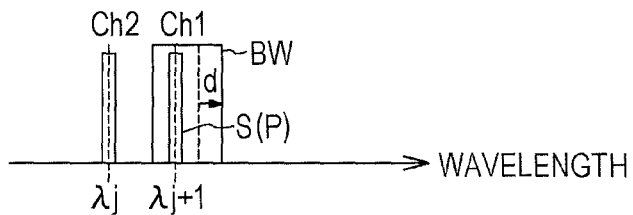

FIG. 11C illustrates a shape where the passband BW of the optical signal S(P) for the replication is extended. In the transmission apparatus 1 of the transmission node A, the multiplexer 121 extends the passband BW to the long wavelength side (symbol d), for example, by the minimum slot width. Also in the transmission apparatus 1 of the relay node B, the multiplexer 121 similarly extends the passband BW.

Figure 11D:
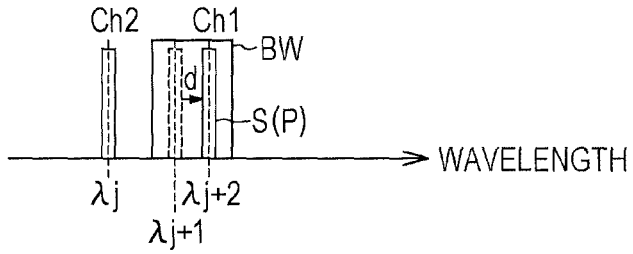

FIG. 11D illustrates a shape where the wavelength of the optical signal S(P) for the replication is changed (shifted) from $\lambda j+1$ to $\lambda j+2$. The wavelength of the optical signal S(P) is changed to the long wavelength side (symbol d). For example, a change amount $\lambda j+2-\lambda j+1$ of the wavelength is an amount (for example, 2.5 (GHz) or less in terms of frequency) of an extent in which the penalty of the optical signal S(P) does not occur in the transmission apparatus 1 of the reception node C. Furthermore, also in the transmission apparatus 1 of the reception node C, the wavelength of the local light of the receiver 130b for the replication is also changed.

Figure 11E:
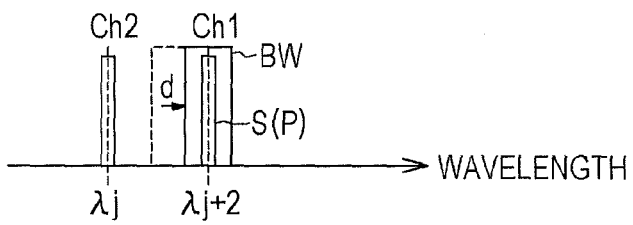

FIG. 11E illustrates a shape where the passband BW of the optical signal S(P) for the replication is reduced. In the transmission apparatus 1 of the transmission node A, the multiplexer 121 reduces the passband BW to the long wavelength side (symbol d), for example, by the minimum slot width. Also in the transmission apparatus 1 of the relay node B, the multiplexer 121 similarly reduces the passband BW.

The process of FIGS. 11B to 11E is repeated until the wavelength of the optical signal S(P) for replication becomes a predetermined target value $\lambda j+n$. That is, the transmitter 131b of the transmission node A changes the wavelength of the optical signal S(P) for the replication until the wavelength becomes a predetermined target value $\lambda j+n$.

Figure 11F:
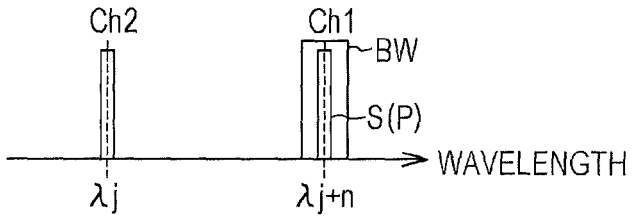

FIG. 11F illustrates a state where the defragmentation process is completed. The wavelength of the optical signal S(P) for the replication reaches a predetermined target value $Xj+n$ instead of the optical signal S(W) of Ch1 by the process described above. After the defragmentation process, each transmission apparatus 1 of the nodes A to C continuously transmits the optical signal S(P) for the replication as the optical signal of Ch1.

Figure 13:
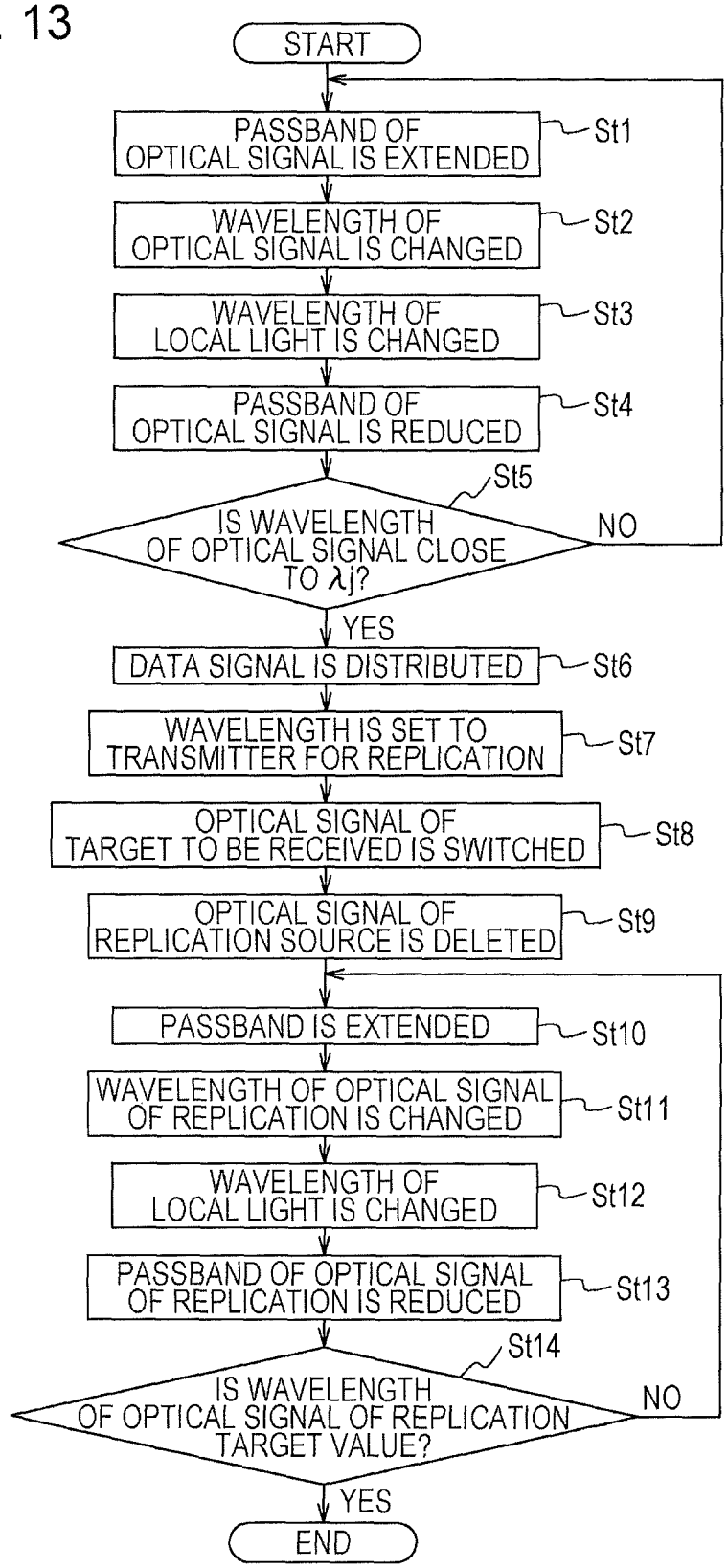
FIG. 13 is a flowchart illustrating the defragmentation process.

FIG. 13 is a flowchart illustrating the defragmentation process. For example, the defragmentation process is performed after the network management device 8 notifies the transmission apparatus 1 of each of the nodes A to C of defragmentation start.

First, in the transmission node A and the relay node B, as illustrated in FIG. 5B, the multiplexer 121 extends the passband BW of the optical signal S(W) of Ch1 (operation St1). Next, in the transmission node A, as illustrated in FIG.

5C, the transmitter 131a for Ch1 changes the wavelength of the optical signal S(W) of Ch1 (operation St2).

Next, in the reception node C, the receiver 130a for Ch1 changes the wavelength λx of the local light depending on the wavelength of the optical signal S(W) of Ch1 (operation St3). Next, in the transmission node A and the relay node B, as illustrated in FIG. 5D, the multiplexer 121 reduces the passband BW of the optical signal S(W) of Ch1 (operation St4).

Next, the network management device 8 determines whether or not the wavelength of the optical signal of Ch1 is close to the wavelength λj of Ch2 (operation St5). For example, the determination process is performed by determining whether or not the difference in each wavelength is greater than a predetermined value.

If the wavelength of the optical signal of Ch1 is not close to the wavelength λj of Ch2 (No of operation St5), the network management device 8 instructs the transmission apparatus 1 of each of the nodes A to C to repeat the process of the operations St1 to St4. In contrast, if the wavelength of the optical signal of Ch1 is close to the wavelength λj of Ch2 (Yes of operation St5), the switch 14 of the transmission node A distributes the data signal Sd of the optical signal S(W) of Ch1 to the transmitter 131a for Ch1 and the transmitter 131b for the replication (operation St6).

Next, the device controller 16 sets the wavelength λj+1 to the transmitter 131b for the replication according to the instruction of the network management device 8 (operation St7). Thus, as illustrated in FIG. 11A, the optical signal S(P) that is the replication of the optical signal S(W) of Ch1 is generated in the wavelength band opposite to the optical signal S(W) of Ch1 across the optical signal of Ch2 and is transmitted to the transmission apparatus 1 of the reception node C.

Next, in the reception node C, the switch 14 switches the target to be received from the optical signal S(W) of Ch1 to the optical signal S(P) for the replication (operation St8). At this time, the device controller 16 controls the switch 14 according to the instruction of the network management device 8. Moreover, the switch 14 performs switching after the synchronization is established between data signals Sd described above, when receiving the instruction of the switching of the target to be received from the device controller 16.

Next, as illustrated in FIG. 11B, the transmitter 131a for Ch1 of the transmission node A deletes the optical signal S(W) of Ch1 that is the replication source by stopping the output according to the instruction of the network management device 8 (operation St9). That is, the transmitter 131a stops the output of the optical signal S(W) of Ch1, after the optical signal S(P) for the replication is output and the transmission apparatus 1 of the reception node C switches the target to be received from the optical signal S(W) of Ch1 of the replication source to the optical signal S(P) for the replication. Thus, in the following process, the transmission apparatus 1 of each of the nodes A to C and the network management device 8 perform the defragmentation process of the optical signal S(P) for the replication.

Next, in the transmission node A and the relay node B, as illustrated in FIG. 11C, the multiplexer 121 extends the passband BW of the optical signal S(P) for the replication (operation St10). Next, in the transmission node A, as illustrated in FIG. 11D, the transmitter 131a for Ch1 changes the wavelength of the optical signal S(P) for the replication (operation St11).

Next, in the reception node C, the receiver 130b for the replication changes the wavelength λx of the local light depending on the wavelength of the optical signal S(P) for the replication (operation St12). Next, in the transmission node A and the relay node B, as illustrated in FIG. 11E, the multiplexer 121 reduces the passband BW of the optical signal S(P) for the replication (operation St13).

Next, the network management device 8 determines whether or not the wavelength of the optical signal S(P) for the replication is equal to a predetermined target value λj+n (operation St14). At this time, the device controller 16 of the node A obtains the wavelength of the optical signal S(P) for the replication from the wavelength controller 1312 of the transmitter 131b for the replication and notifies the network management device 8 of the wavelength thereof.

The network management device 8 completes the defragmentation process if the wavelength of the optical signal S(P) for the replication is equal to a predetermined target value λj+n (Yes of operation St14). Meanwhile, the network management device 8 instructs the transmission apparatus 1 of each of the nodes A to C to repeat the process of the operations St10 to St13 if the wavelength of the optical signal S(P) for the replication is not equal to a predetermined target value λj+n (No of operation St14). Thus, the defragmentation process of the optical signal S(P) for the replication is performed until the wavelength of the optical signal S(P) for the replication reaches a predetermined target value λj+n. As described above, the defragmentation process is performed.

Second Embodiment

The defragmentation process described above may be applied to a plurality of subcarrier signals accommodating the common client signal by dividing the common client signal in addition to a single optical signal. The plurality of subcarrier signals are modulated by a multi-value modulation unit such as DP-QPSK and are transmitted by being bundled by wavelength multiplex. Moreover, the multiplexed optical signal obtained by bundling the plurality of subcarrier signals is referred to as a "super channel" and a transmitting method of a multi-carrier signal is referred to as "multi-carrier transmission".

In the defragmentation process of the embodiment, as one example, each wavelength of four subcarrier signals SC1 to SC4 is changed beyond the wavelength of optical signal of Ch2 of which the transmission line overlaps with those of the subcarrier signals SC1 to SC4. Each of the subcarrier signals SC1 to SC4 is replicated one by one, similar to the first embodiment, and is deleted after the switching process in the reception node, and thereby the defragmentation process is performed.

Moreover, the subcarrier signals SC1 to SC4 are assumed to be transmitted between the nodes A to C illustrated in FIG. 4. Thus, the subcarrier signals SC1 to SC4 and the optical signal of Ch2 are transmitted to the optical fiber between the node B and the node C as the multiplexed optical signal.

Figure 14A:
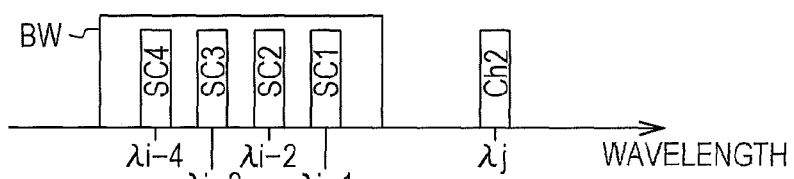
FIGS. 14A to 14U are views illustrating a process of a defragmentation process of a second embodiment.

FIGS. 14A to 14U are views illustrating a process of the defragmentation process of the second embodiment. FIG. 14A illustrates the spectra of the subcarrier signals SC1 to SC4 (first optical signal) and the optical signal (second optical signal) of Ch2 in an initial state. Here, wavelengths of the subcarrier signals SC1 to SC4 are respectively λi−4, λi−2, and λi−1. In addition, a symbol BW indicates the passband of the subcarrier signals SC1 to SC4 set in the multiplexer 121, the MUX 125, the DMUX 124, and the DMUX 120 of the node A. In the process described below, each passband BW of the MUX 121, the MUX 125, the DMUX 124, and the DMUX 120 is changed, but in the description, each of 120, 121, 124, and 125 is typically referred to as "MUX 121 and the like".

Figure 14B:
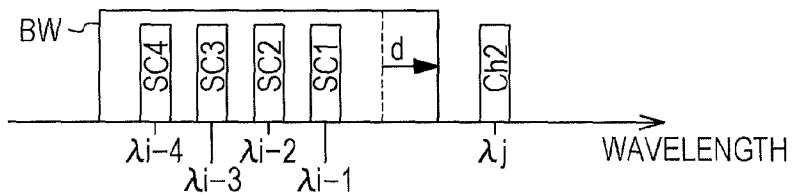

FIG. 14B illustrates a shape where the passband BW is extended. The multiplexer 121 and the like of the transmission node A extend the passband BW to the long wavelength side (symbol d), for example, by the minimum slot width. At this time, also in the transmission apparatus 1 of the relay node B, the multiplexer 121 and the like extend the passband BW of the subcarrier signals SC1 to SC4 to the long wavelength side.

Figure 14C:
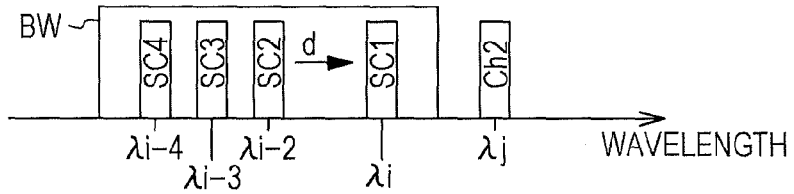

FIG. 14C illustrates a shape where the wavelength of the subcarrier signal SC1 is changed (shifted) from $\lambda i-1$ to $\lambda i$. In the transmission node A, the wavelength controller 1312 controls the wavelength variable laser diode 1311 and changes the wavelength of the subcarrier signal SC1 to the long wavelength side (symbol d). For example, a change amount $\lambda i-\lambda i-1$ of the wavelength is an amount (for example, 2.5 (GHz) or less in terms of frequency) of an extent in which the penalty of the subcarrier signal SC1 does not occur in the transmission apparatus 1 of the reception node C. At this time, in the transmission apparatus 1 of the reception node C, the wavelength controller 1302 changes the wavelength $\lambda x$ of the local light depending on the change in the wavelength of the subcarrier signal SC1.

Figure 14D:
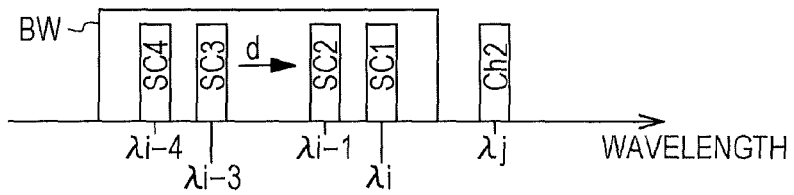
Figure 14E:
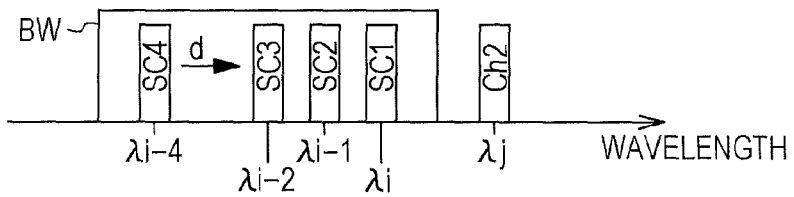
Figure 14F:
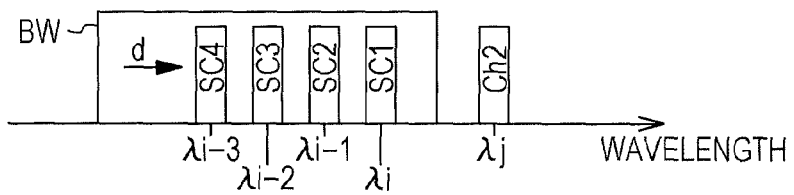

Also, the wavelengths of other subcarrier signals SC2 to SC4 are changed similar to the subcarrier signal SC1. FIG. 14D illustrates a shape where the wavelength of the subcarrier signal SC2 is changed from $\lambda i-2$ to $\lambda i-1$. FIG. 14E illustrates a shape where the wavelength of the subcarrier signal SC3 is changed from $\lambda i-3$ to $\lambda i-2$. FIG. 14F illustrates a shape where the wavelength of the subcarrier signal SC4 is changed from $\lambda i-4$ to $\lambda i-3$.

Figure 14G:
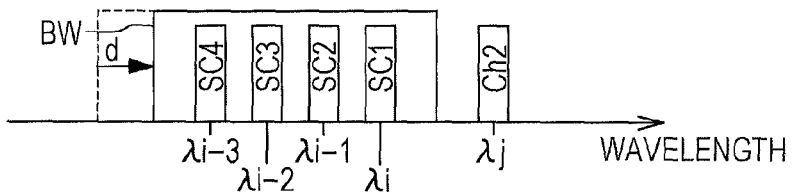

FIG. 14G illustrates a shape where the passband BW is reduced. The multiplexer 121 and the like of the transmission node A reduce the passband BW to the long wavelength side (symbol d), for example, by the minimum slot width. At this time, also in the transmission apparatus 1 of the relay node B, the multiplexer 121 and the like reduce the passband BW of the subcarrier signals SC1 to SC4 to the long wavelength side.

The wavelengths of the subcarrier signals SC1 to SC4 become values close to the wavelength $\lambda j$ on the short wavelength side of the wavelength $\lambda j$ of the optical signal of Ch2 by repeating the process of FIGS. 14A to 14G. In the example, at this time, the wavelengths of the subcarrier signals SC1 to SC4 are $\lambda i-2$, and $\lambda i-3$, respectively.

Figure 14H:
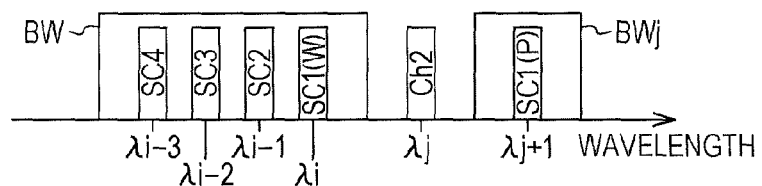

FIG. 14H illustrates a shape where the subcarrier signal SC1 is replicated. Here, the optical signal of the replication source is referred to as "SC1(W)" and the optical signal obtained by being replicated is referred to as "SC1(P)".

In the transmission node A, the transmitter 131 for the replication generates and outputs the subcarrier signal SC1(P) (third optical signal) that is the replication of the subcarrier signal SC1(W) in the wavelength band opposite to the optical signal SC1(W) across the optical signal of Ch2. For example, the wavelength $\lambda j+1$ of the optical signal SC1(P) for the replication is set to be the wavelength $\lambda j$ inside a range in which the crosstalk is allowed between the optical signal of Ch2 and the optical signal SC1(P) for the replication, and within a range in which the buffer amount of the transmission apparatus 1 of the reception node C may be allowed, in the wavelength band on the long wavelength side of the wavelength $2j$ of the optical signal of Ch2. Moreover, a symbol BWj indicates the passband of the optical signal SC1 for the replication. Hereinafter, an operation when replicating will be described with reference to FIG. 15.

Figure 15:
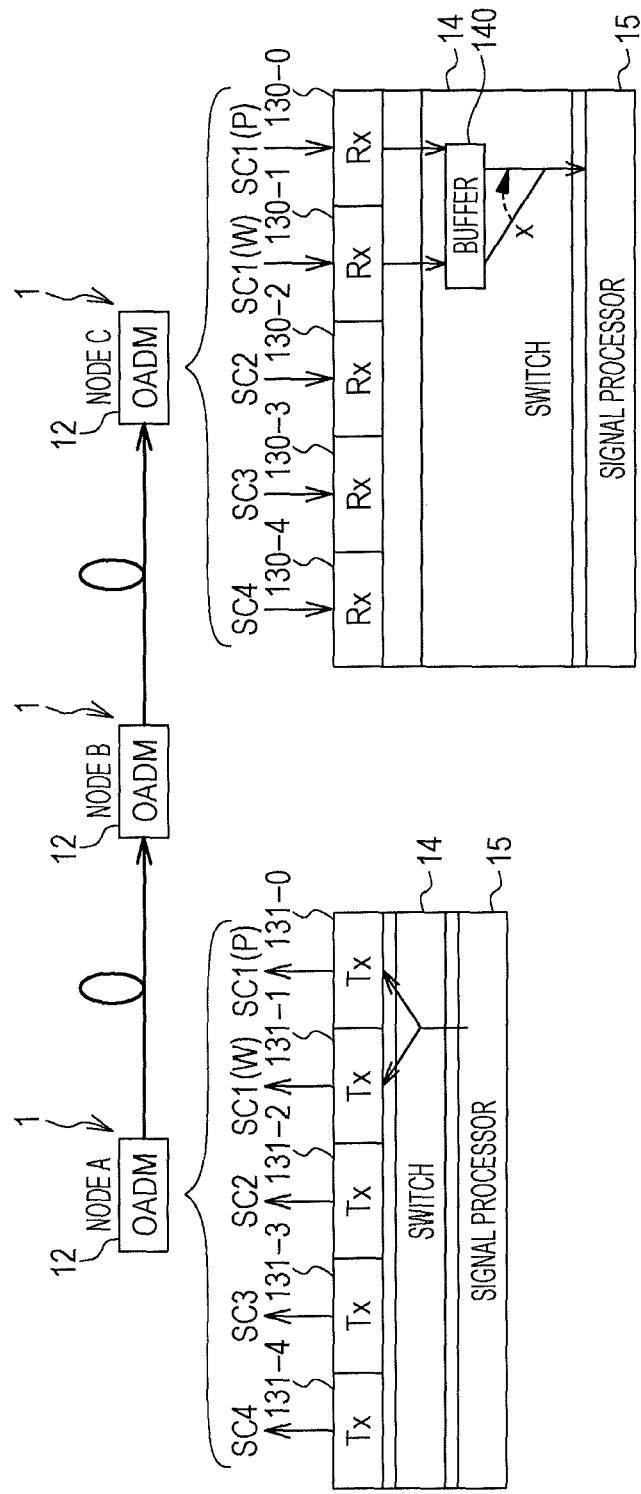
FIG. 15 is a configuration view illustrating an operation (when replicating a subcarrier signal SC1) of each transmission apparatus of the transmission node and the reception node in the defragmentation process.

FIG. 15 is a configuration view illustrating an operation (when replicating a subcarrier signal SC1) of each transmission apparatus 1 of the transmission node A and the reception node C in the defragmentation process. Transmitters 131-1 to 131-4 for SC1 to SC4 outputting respectively the subcarrier signals SC1(W) and SC2 to SC4, and a transmitter 131-0 for the replication of an optical signal SC1(P) for the replication among the plurality of the transmitters 131 of the transmission node A are illustrated in FIG. 15. Furthermore, receivers 130-1 to 130-4 for SC1 to SC4 respectively receiving the subcarrier signals SC1(W) and SC2 to SC4, and a receiver 130-0 for the replication receiving the optical signal SC1(P) for the replication among the plurality of receivers 130 of the reception node C are illustrated in FIG. 15.

In the transmission node A, the switch 14 respectively distributes the data signal Sd input from the signal processor 15 to the transmitter 131-1 for SC1 and the transmitter 131-0 for the replication. Therefore, the transmitter 131-1 for SC1 generates the subcarrier signal SC1(W) based on the data signal Sd and the transmitter 131-0 for the replication generates the optical signal SC1(P) for the replication based on the data signal Sd.

The subcarrier signal SC1(W) and the optical signal SC1(P) for the replication are multiplexed by the optical add-drop multiplexer 12 and are input into the receiver 130 of the transmission apparatus 1 of the reception node C through the transmission apparatus 1 of the relay node B as the multiplexed optical signal Smx. Moreover, in the transmission apparatus 1 of the relay node B, the passed setting of the optical signal SC1(P) for the replication is performed in the multiplexer 121 and the like, and the optical signal of Ch2 is inserted and the optical signal of Ch2 is added to the multiplexed optical signal Smx.

Meanwhile, in the reception node C, the receiver 130-1 for SC1 receives the subcarrier signal SC1(W) and the receiver 130-0 for the replication receives the optical signal SC1(P) for the replication. The receiver 130-1 for SC1 generates the data signal Sd from the subcarrier signal SC1(W) and the receiver 130-0 for the replication generates the data signal Sd from the optical signal SC1(P) for the replication.

Each data signal Sd output from the receivers 130-0 and 130-1 is stored in the buffer 140 inside the switch 14, for example, by packet unit. The switch 14 switches (see symbol x) the output source of the data signal Sd output to the signal processor 15 from the receiver 130-1 for SC1 to the receiver 130-0 for the replication, after the synchronizing process between the data signals Sd is performed. Therefore, the signal processor 15 receives the data signal Sd obtained from the optical signal SC1(P) for the replication instead of the data signal Sd obtained from the subcarrier signal SC1(W).

As described above, the transmission apparatus 1 of the reception node C switches the target to be received from the subcarrier signal SC1(W) to the optical signal SC1(P) for the replication, after the optical signal SC1(P) for the replication is output from the transmission apparatus 1 of the transmission node A. Therefore, each transmission apparatus 1 of the nodes A to C can perform the defragmentation process in which the wavelength of the optical signal SC1(P) for the replication is changed to the wavelength band beyond the wavelength of the optical signal of Ch2. If the switching process is completed in the reception node C, the transmission apparatus 1 of the transmission node A deletes the subcarrier signal SC1(W) of the replication source.

Figure 14I:
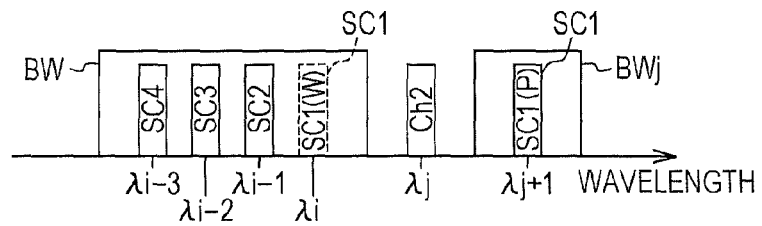

FIG. 14I illustrates a shape where the subcarrier signal SC1(W) of the replication source is deleted. The transmitter 131-1 for SC1 stops the output of the subcarrier signal SC1(W), after the optical signal SC1(P) for the replication is output from the transmitter 131-0 for the replication. Thus, the subcarrier signal SC1(W) of the replication source is deleted. Moreover, output stop control of the optical signal S(W) is, for example, performed by the device controller 16, based on the instruction of the network management device 8.

Figure 14J:
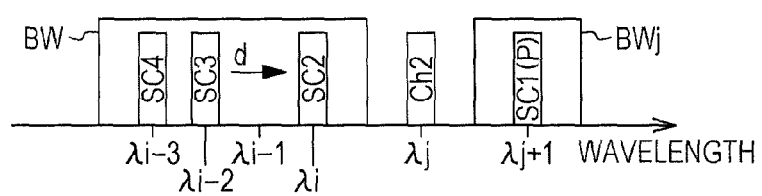

FIG. 14J illustrates a shape where the wavelength of a subcarrier signal SC2 is changed (shifted) from $\lambda i-1$ to $\lambda i$. In the transmission node A, the wavelength controller 1312 controls the wavelength variable laser diode 1311 and changes the wavelength of the subcarrier signal SC2 to the long wavelength side (symbol d). For example, a change amount $\lambda i - \lambda i - 1$ of the wavelength is an amount (for example, 2.5 (GHz) or less in terms of frequency) of an extent in which the penalty of the subcarrier signal SC2 does not occur in the transmission apparatus 1 of the reception node C. At this time, in the reception node C, the receiver 130-2 for SC2 changes the wavelength $\lambda x$ of the local light depending on the change in the wavelength of the subcarrier signal SC2.

Figure 14K:
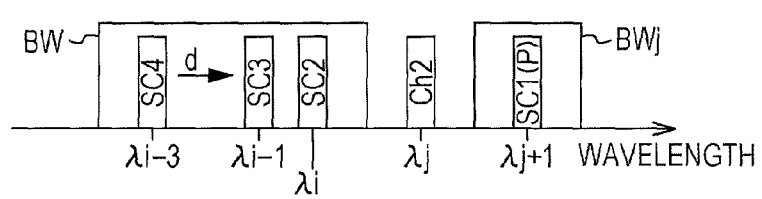
Figure 14L:

The wavelengths of other subcarrier signals SC3 and SC4 are changed similar to that of the subcarrier signal SC2. FIG. 14K illustrates a shape where the wavelength of the subcarrier signal SC3 is changed from $\lambda i-2$ to $\lambda i-1$. FIG. 14L illustrates a shape where the wavelength of the subcarrier signal SC4 is changed from $\lambda i-3$ to $\lambda i-2$.

Figure 14M:
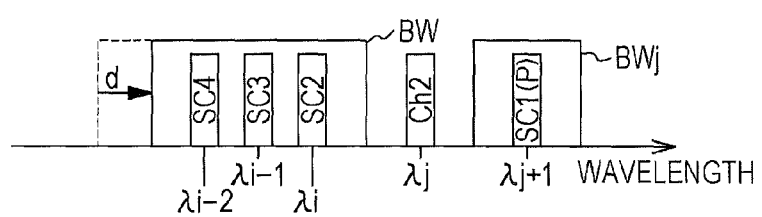

FIG. 14M illustrates a shape where the passband BW is reduced. The multiplexer 121 and the like of the transmission node A reduce the passband BW to the long wavelength side (symbol d), for example, by the minimum slot width. At this time, also in the transmission apparatus 1 of the relay node B, the multiplexer 121 and the like reduce the passband BW of the subcarrier signals SC2 to SC4 to the long wavelength side.

FIG. 14N illustrates a shape where a passband BWj of the optical signal SC1(P) for the replication is extended. The multiplexer 121 and the like of the transmission node A extend the passband BWj to the long wavelength side (symbol d), for example, by the minimum slot width. At this time, also in the transmission apparatus 1 of the relay node B, the multiplexer 121 and the like extend the passband BWj of the optical signal SC1(P) for the replication to the long wavelength side.

FIG. 14O illustrates a shape where the wavelength of the optical signal SC1(P) for the replication is changed (shifted) from $\lambda i+1$ to $\lambda j+2$. In the transmission node A, the wavelength controller 1312 controls the wavelength variable laser diode 1311 and changes the wavelength of the optical signal SC1(P) for the replication to the long wavelength side (symbol d). For example, a change amount $\lambda j+2 - \lambda j+1$ of the wavelength is an amount (for example, 2.5 (GHz) or less in terms of frequency) of an extent in which the penalty of the optical signal SC1(P) for the replication does not occur in the transmission apparatus 1 of the reception node C. In the transmission apparatus 1 of the reception node C, the wavelength controller 1302 changes the wavelength $\lambda x$ of the local light depending on the change in the wavelength of the optical signal SC1(P) for the replication.

FIG. 14P illustrates a shape where the subcarrier signal SC2 is replicated. Here, the optical signal of the replication source is referred to as "SC2(W)" and the optical signal obtained by being replicated is referred to as "SC2(P)".

In the transmission node A, the transmitter 131-1 for SC1 generates and outputs the optical signal SC2(P) (third optical signal) that is the replication of another subcarrier signal SC2(W) in the wavelength band opposite to the subcarrier signal SC2(W) across the optical signal of Ch2, after deletion of the subcarrier signal SC1. For example, the wavelength $\lambda j+1$ of the optical signal SC2(P) for the replication and the wavelength $\lambda i$ of the optical signal SC2(W) for the replication are a positional relationship symmetrical on both sides of the optical signal of Ch2. Hereinafter, an operation when replicating will be described with reference to FIG. 16.

Figure 16:
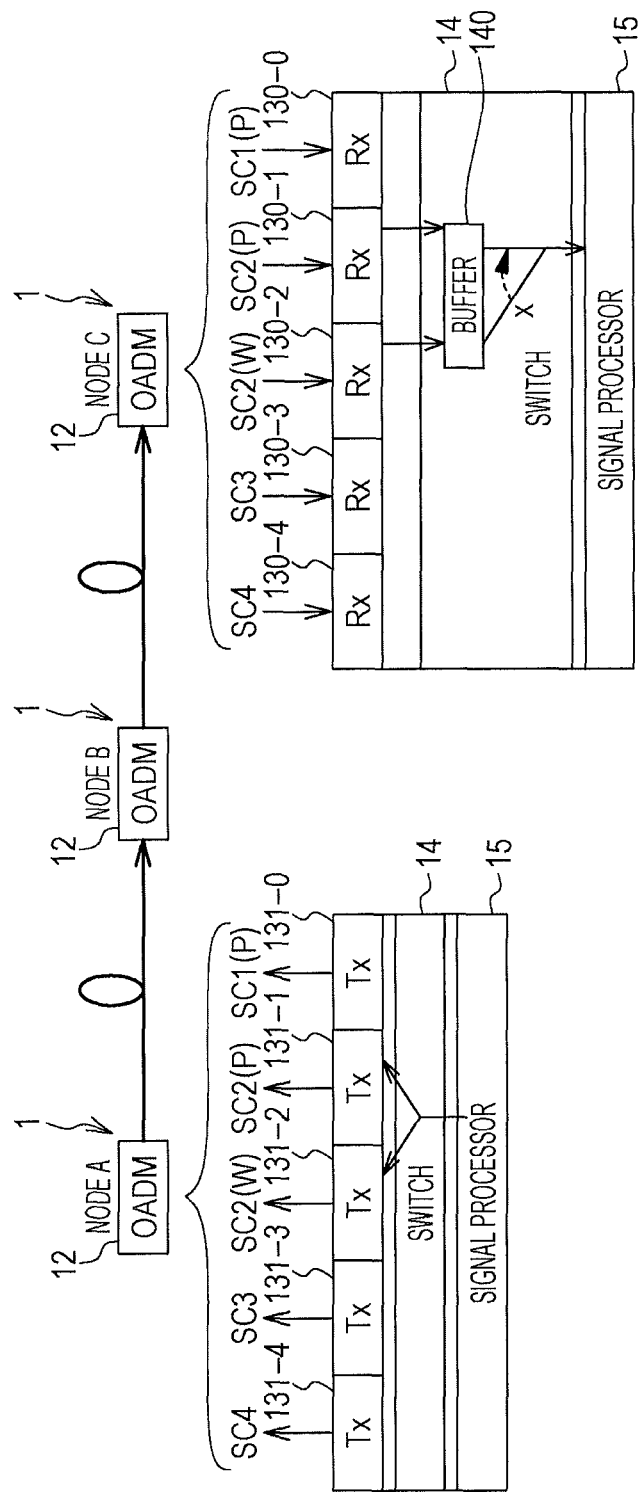
FIG. 16 is a configuration view illustrating an operation (when replicating a subcarrier signal SC2) of each transmission apparatus of the transmission node and the reception node in the defragmentation process.

FIG. 16 is a configuration view illustrating an operation (when replicating the subcarrier signal SC2) of each transmission apparatus of the transmission node A and the reception node C in the defragmentation process. The replication of the subcarrier signal SC2 in the transmission node A and the switching of the subcarrier signal SC2 in the reception node C are similar to the contents (case of the subcarrier signal SC1) described with reference to FIG. 15.

As described with reference to FIG. 15, in the transmission node A, the transmitter 131-0 for the replication outputs the optical signal SC1(P) for the replication of the subcarrier signal SC1. Thus, the transmitter 131-1 for SC1 outputs the optical signal SC2(P) for the replication of the subcarrier signal SC2 instead of the transmitter 131-0 for the replication.

In contrast, in the reception node C, the receiver 130-1 for the replication receives the optical signal SC1(P) for the replication of the subcarrier signal SC1. Thus, the receiver 130-1 for SC1 receives the optical signal SC2(P) for the replication of the subcarrier signal SC2 instead of the transmitter 131-0 for the replication.

Therefore, in the transmission node A, the transmitter 131-2 for SC2 outputs the subcarrier signal SC2(W) and the transmitter 131-1 for SC1 outputs the optical signal SC2(P) for the replication. In the reception node C, the receiver 130-2 for SC2 receives the subcarrier signal SC2(W) and the receiver 130-1 for Sc1 receives the optical signal SC2(P) for the replication.

In the reception node C, after the target to be received is switched from the subcarrier signal SC2(W) to the optical signal SC2(P) for the replication, in the transmission node A, the transmitter 131-2 for SC2 stops the output of the subcarrier signal SC2(W) of the replication source.

Moreover, when replicating other subcarrier signals SC3 and SC4, the transmitters 131-2 and 131-3 in which the optical output is stopped are used as the transmitters for the replication and the receivers 130-2 and 130-3 in which the optical receiving is stopped are used as the receivers for the replication. That is, one of the transmitters 131-1 to 131-4 is used as the transmitter for the replication and one of the receivers 130-1 to 130-4 is used as the receiver for the replication.

Thus, the number of the transmitters 131 and the number of the receivers 130 are reduced and costs for the apparatus are reduced compared to a case where the transmitter 131-0 and the receiver 130-0 for the replication are provided for each of the subcarrier signals SC1 to SC4.

FIG. 14Q illustrates a shape where the subcarrier signal SC2(W) of the replication source is deleted. The transmitter 131-2 for SC2 stops the output of the subcarrier signal SC2(W), after the optical signal SC2(P) for the replication is output from the transmitter 131-1 for the replication (SC1). Thus, the optical signal SC2(W) of the replication source is deleted. Moreover, output stop control of the subcarrier signal SC2(W) is, for example, performed by the device controller 16, based on the instruction of the network management device 8.

FIG. 14R illustrates a shape where the wavelength of a subcarrier signal SC3 is changed (shifted) from $\lambda i-1$ to $\lambda i$. In the transmission node A, the wavelength controller 1312 controls the wavelength variable laser diode 1311 and changes the wavelength of the subcarrier signal SC3 to the long wavelength side (symbol d). For example, a change amount $\lambda i - \lambda i - 1$ of the wavelength is an amount (for example, 2.5 (GHz) or less in terms of frequency) of an extent in which the penalty of a subcarrier signal SC# almost does not occur in the transmission apparatus 1 of the reception node C. At this time, in the transmission apparatus 1 of the reception node C, the receiver 130-2 for SC3 changes the wavelength $\lambda x$ of the local light depending on the change in the wavelength of the subcarrier signal SC3.

The wavelength of the subcarrier signal SC4 are changed similar to that of the subcarrier signal SC3. FIG. 14S illustrates a shape where the wavelength of the subcarrier signal SC4 is changed from $\lambda i-2$ to $\lambda i-1$.

FIG. 14T illustrates a shape where the passband BW is reduced. The multiplexer 121 of the transmission node A reduces the passband BW of the subcarrier signals SC3 and SC4 to the long wavelength side (symbol d), for example, by the minimum slot width. At this time, also in the transmission apparatus 1 of the relay node B, the multiplexer 121 reduces the passband BW of the subcarrier signals SC3 and SC4 to the long wavelength side.

Thereafter, the wavelengths of the subcarrier signals SC3 and SC4 are changed to the wavelength band opposite to the wavelength of the optical signal of Ch2 by also performing the same process as FIGS. 14N to 14T in the remaining subcarrier signals SC3 and SC4. Moreover, the replication and switching of the subcarrier signals SC3 and SC4 are performed in the same manner as the contents described with reference to FIGS. 15 and 16.

FIG. 14U illustrates a shape where the defragmentation process is completed. The wavelengths of the optical signals SC1(P) to SC4(P) for the replication of the subcarrier signals SC1 to SC4 reach predetermined target values $\lambda j+4$ to $\lambda j+1$ by the process described above. Moreover, in the example, a case where the target values $\lambda j+4$ to $\lambda j+1$ are in the vicinity of the wavelength $\lambda j$ of the optical signal of Ch2 is illustrated, but if the target value is separated from the wavelength $\lambda j$, the same process as that illustrated in FIGS. 14B to 14G is repeated until the wavelength of the subcarrier signal reaches the target value.

After the defragmentation process, each transmission apparatus 1 of the nodes A to C continuously transmits the optical signals SC1(P) to SC4(P) for the replication as the subcarrier signals SC1 to SC4.

Figure 17:
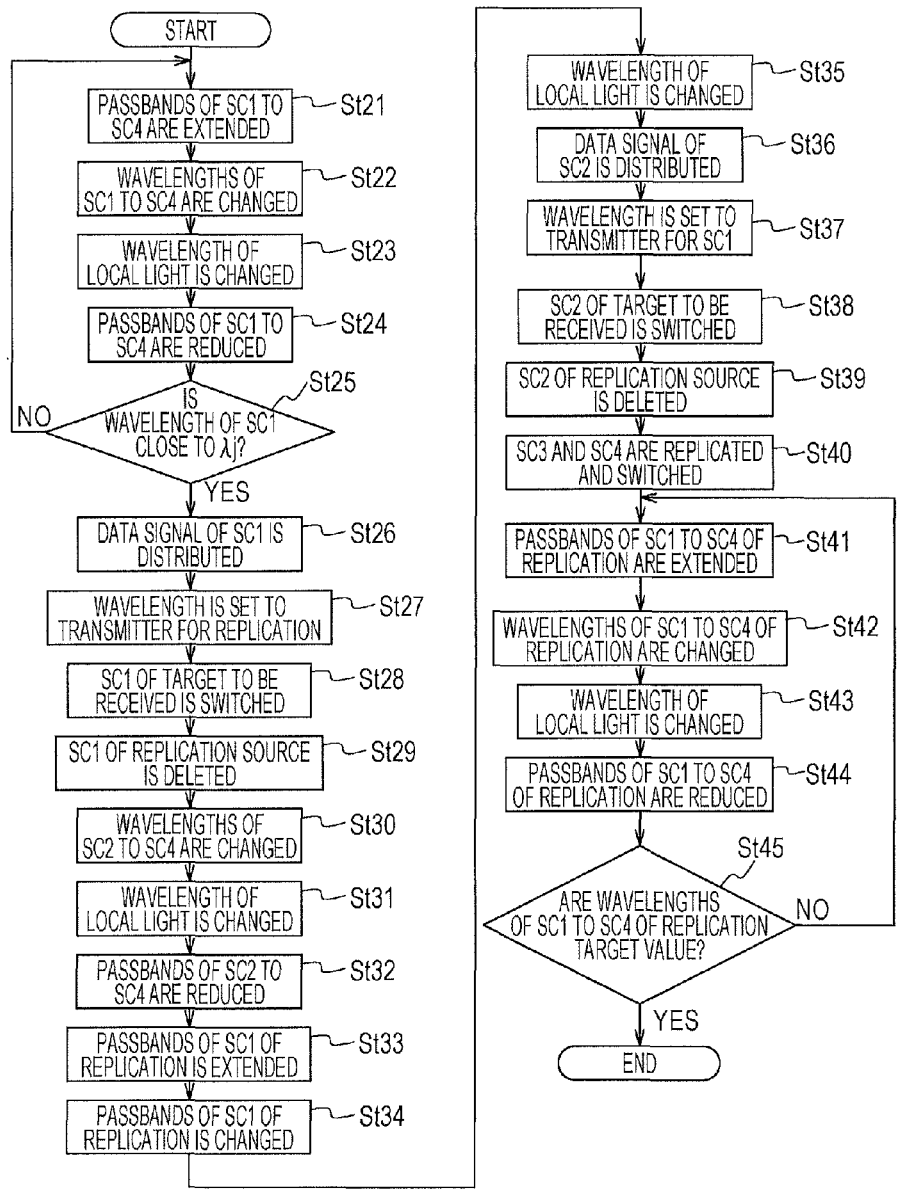
FIG. 17 is a flowchart illustrating the defragmentation process.

FIG. 17 is a flowchart illustrating the defragmentation process. For example, the defragmentation process is performed after the network management device 8 notifies the transmission apparatus 1 of each of the nodes A to C of defragmentation start.

First, in the transmission node A and the relay node B, as illustrated in FIG. 14B, the multiplexer 121 and the like extend the passband BW of the subcarrier signals SC1 to SC4 (operation St21). Next, in the transmission node A, as illustrated in FIGS. 14C to 14F, the transmitters 131-1 to 131-4 for SC1 to SC4 change the wavelengths of the subcarrier signals SC1 to SC4 (operation St22).

Next, in the reception node C, the receivers 130-1 to 130-4 for SC1 to SC4 change the wavelength $\lambda x$ of the local light depending on the wavelengths of the subcarrier signals SC1 to SC4 (operation St23). Next, in the transmission node A and the relay node B, as illustrated in FIG. 14G, the multiplexer 121 and the like reduce the passband BW of the subcarrier signals SC1 to SC4 (operation St24).

Next, the network management device 8 determines whether or not the wavelength of the subcarrier signal SC1 is close to the wavelength $\lambda j$ of Ch2 (operation St25). For example, the determination process is performed by determining whether or not the difference in each wavelength is greater than a predetermined value.

If the wavelength of the subcarrier signal SC1 is not close to the wavelength $\lambda j$ of Ch2 (No of operation St25), the network management device 8 instructs the transmission apparatus 1 of each of the nodes A to C to repeat the process of the operations St21 to St24. In contrast, if the wavelength of the subcarrier signal SC1 is close to the wavelength $\lambda j$ of Ch2 (Yes of operation St25), the switch 14 of the transmission node A distributes the data signal Sd of the subcarrier signal SC1 to the transmitter 131-1 for SC1 and the transmitter 131-0 for the replication (operation St26).

Next, the device controller 16 sets the wavelength $\lambda j+1$ to the transmitter 131-0 for the replication according to the instruction of the network management device 8 (operation St27). Thus, as illustrated in FIG. 14H, the optical signal SC1(P) that is the replication of the subcarrier signal SC1(W) is generated in the wavelength band opposite to the subcarrier signal SC1(W) across the optical signal of Ch2 and is transmitted to the transmission apparatus 1 of the reception node C.

Next, in the reception node C, the switch 14 switches the target to be received from the subcarrier signal SC1(W) to the optical signal SC1(P) for the replication (operation St28). At this time, the device controller 16 controls the switch 14 according to the instruction of the network management device 8.

Next, as illustrated in FIG. 14I, the transmitter 131-1 for SC1 of the transmission node A deletes the subcarrier signal SC1(W) that is the replication source by stopping the output according to the instruction of the network management device 8 (operation St29). Next, in the transmission node A, as illustrated in FIGS. 14J to 14L, the transmitter 131a for SC1 changes the wavelengths of the subcarrier signals SC2(W) to SC4(W) (operation St30).

Next, in the reception node C, the receivers 130-2 to 130-4 for SC2 to SC4 change the wavelength $\lambda x$ of the local light depending on the wavelengths of the carrier signals SC2(W) to SC4(W) (operation St31). Next, in the transmission node A and the relay node B, as illustrated in FIG. 14M, the multiplexer 121 and the like reduce the passband BW of the carrier signals SC2(W) to SC4(W) (operation St32).

Next, in the transmission node A and the relay node B, as illustrated in FIG. 14N, the multiplexer 121 and the like extend the passband BWj of the subcarrier signal SC1(P) for the replication (operation St33). Next, in the transmission node A, as illustrated in FIG. 14O, the transmitter 131-0 for the replication changes the wavelength of the subcarrier signal SC1(P) for the replication (operation St34). Next, in the reception node C, the receiver 130-0 for the replication changes the wavelength $\lambda x$ of the local light depending on the wavelength of the subcarrier signal SC1(P) for the replication (operation St35).

Next, the switch 14 of the transmission node A distributes the data signal Sd of the subcarrier signal SC2(W) to the transmitter 131-1 for SC1 (for replication) and the transmitter 131-2 for SC2 (operation St36). At this time, the device controller 16 controls the switch 14 according to the instruction of the network management device 8.

Next, the device controller 16 sets the wavelength λj+1 to the transmitter 131-1 for the replication according to the instruction of the network management device 8 (operation St37). Thus, as illustrated in FIG. 14P, the subcarrier signal SC2(P) that is the replication of the subcarrier signal SC2 (W) is generated in the wavelength band opposite to the subcarrier signal SC2(W) across the optical signal of Ch2 and is transmitted to the transmission apparatus 1 of the reception node C.

Next, in the reception node C, the switch 14 switches the target to be received from the subcarrier signal SC2(W) to the subcarrier signal SC2(P) for the replication (operation St38). At this time, the device controller 16 controls the switch 14 according to the instruction of the network management device 8.

Next, as illustrated in FIG. 14Q, the transmitter 131-2 for SC2 of the transmission node A deletes the subcarrier signal SC2(W) that is the replication source by stopping the output according to the instruction of the network management device 8 (operation St39).

Next, the replication and switching of other subcarrier signals SC3 and SC4 are performed in the same manner as the subcarrier signals SC1 and SC2 (operation St40). That is, the process of the operations St30 to St39 is repeated so that each wavelength of the subcarrier signals SC3 and SC4 exceeds the wavelength λj of the optical signal of Ch2.

Next, in the transmission node A and the relay node B, the multiplexer 121 extends the passband BWj of the subcarrier signals SC1(P) to SC4(P) for the replication (operation St41). Next, in the transmission node A, the transmitters 131-0 to 131-3 for SC1 to SC4 change the wavelengths of the subcarrier signals SC1(P) to SC4(P), respectively, for the replication (operation St42).

Next, in the reception node C, the receivers 130-0 to 130-3 for the SC1 to SC4 change the wavelength λx of the local light depending on the wavelengths of the subcarrier signals SC1(P) to SC4(P) for the replication (operation St43). Next, in the transmission node A and the relay node B, the multiplexer 121 and the like reduce the passband BWj of the subcarrier signals SC1(P) to SC4(P) for the replication (operation St44).

Next, the network management device 8 determines whether or not the wavelengths of the subcarrier signals SC1(P) to SC4(P) for the replication are respectively equal to a predetermined target value (operation St45). At this time, the device controller 16 of the node A obtains the wavelengths of the subcarrier signals SC1(P) to SC4(P) for the replication from the transmitters 131-0 to 131-3 for SC1 to SC4 and notifies the network management device 8 of the wavelengths thereof.

The network management device 8 completes the defragmentation process if the wavelengths of the subcarrier signals SC1(P) to SC4(P) for the replication are respectively equal to a predetermined target value (Yes of operation St45). In contrast, the network management device 8 instructs the transmission apparatus 1 of each of the nodes A to C to repeat the process of operation St41 to St44 if the wavelengths of the subcarrier signals SC1(P) to SC4(P) for the replication are not respectively equal to the predetermined target value (No of operation St45). Thus, the defragmentation process of the optical signals SC1(P) to SC4(P) for the replication is performed until the wavelengths of the optical signals SC1(P) to SC4(P) for the replication respectively reach the predetermined target value. As described above, the defragmentation process is performed.

Figure 18:
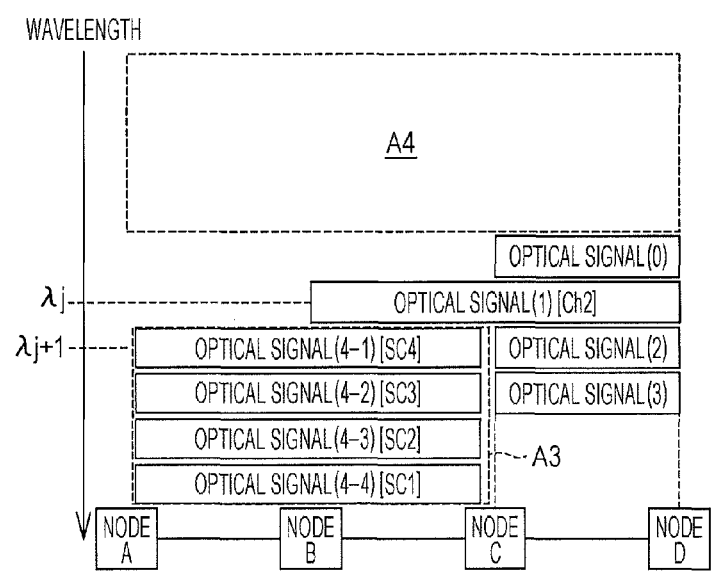
FIG. 18 is an arrangement view illustrating a wavelength arrangement between the nodes after the defragmentation process of the embodiment.

FIG. 18 is an arrangement view illustrating a wavelength arrangement between the nodes A to D after the defragmentation process of the embodiment. Here, the optical signals (4-1) to (4-4) correspond to the subcarrier signals SC1 to SC4 or the optical signal of Ch1. Moreover, the wavelength arrangement between the nodes A to D before the defragmentation process is illustrated in FIG. 6A.

As described above, the wavelength of the optical signal of Ch1 or the wavelengths of the subcarrier signals SC1 to SC4 can be changed beyond the wavelength of the optical signal of Ch2 with which the transmission line is overlapped. Thus, the wavelengths of the optical signals (4-1) to (4-4) can be arranged in the fragmentation area A3 by shifting the wavelengths to the wavelength band on the long wavelength side of the wavelength of the optical signal (1). Therefore, a free area A4 wider than the free area A2 that is obtained by the defragmentation process of the comparative example is secured in addition to deletion of the fragmentation area A3 that may not be deleted in the comparative example.

As described above, according to the embodiment, the target value of the wavelengths of the optical signals (4-1) to (4-4) is set on the long wavelength side of the wavelength of the optical signal (1) and the wavelength accommodation efficiency can be effectively improved. Moreover, in the embodiment, the defragmentation process in which the wavelength is shifted on the long wavelength side is exemplified, but the defragmentation process in which the wavelength is shifted on the short wavelength side is also performed in the same manner as described above.

As described above, the transmission apparatus 1 according to the embodiment has the first output units (transmitters) 131a and 131-1, and the second output units (transmitters) 131b and 131-0. The first output units 131a and 131-1 output the first optical signals (S(W), SC1(W)) of which the wavelengths are variable and cause the wavelengths of the first optical signals to be close to the wavelength of the second optical signal (Ch2) with which the first optical signals and the transmission line are overlapped. The second output units 131b and 131-0 generate and output the third optical signals (S(P), SC1(P)) that are the replication of the first optical signals in the wavelength band opposite to the first optical signals across the second optical signal. The first output units 131a and 131-1 stop the output of the first optical signals after the third optical signals are output and another transmission apparatus 1 (reception node C) switches the target to be received from the first optical signals to the third optical signals.

Therefore, in the defragmentation process to target of the first optical signals, the wavelengths of the first optical signals can be changed beyond the wavelength of the second optical signal. Thus, according to the transmission apparatus 1 of the embodiment, the target value of the wavelengths of the first optical signals can be set to a value beyond the wavelength of the second optical signal viewed from the wavelength and the wavelength accommodation efficiency can be effectively improved.

Furthermore, since the first output units 131a and 131-1 cause the wavelength of the first optical signal to be close to the wavelength of the second optical signal, the wavelength difference between the first optical signals and the third optical signals is reduced. Thus, in the transmission apparatus 1 on the receiving side, a delay difference between the first optical signals and the third optical signals is reduced and the buffer amount storing each item of data of the first optical signals and the third optical signals is reduced when switching the target to be received from the first optical signals to the third optical signals.

Furthermore, the transmission system according to the embodiment has the first transmission apparatus (transmission apparatus of the transmission node A) 1 and the second transmission apparatus (transmission apparatus of the reception node C) 1 connected to each other through one or more transmission lines.

The first transmission apparatus 1 has the first output units (transmitters) 131*a* and 131-1, and the second output units (transmitters) 131*b* and 131-0. The first output units 131*a* and 131-1 output the first optical signals (S(W), SC1(W)) of which the wavelengths are variable and cause the wavelengths of the first optical signals to be close to the wavelength of the second optical signal (Ch2) with which the first optical signals and the transmission line are overlapped. The second output units 131*b* and 131-0 generate and output the third optical signals (S(P), SC1(P)) that are the replication of the first optical signals in the wavelength band opposite to the first optical signals across the second optical signal.

The second transmission apparatus 1 switches the target to be received from the first optical signals to the third optical signals after the third optical signals are output. The first output units 131*a* and 131-1 stop the output of the first optical signals.

Since the transmission system according to the embodiment includes the transmission apparatus 1 described above, the transmission system provides the same effects as the contents described above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission apparatus comprising:
a first output unit configured to generate a first optical signal of which a first wavelength is variable and control the first wavelength to be close to a second wavelength of a second optical signal transmitted as a multiplexed optical signal with the first optical signal, the first output unit outputting the first optical signal to another transmission apparatus; and
a second output unit configured to generate a third optical signal that is replication of the first optical signal in a wavelength band opposite to the first wavelength across the second wavelength, the second output unit outputting the third optical signal to the another transmission apparatus,
wherein the first output unit stops outputting the first optical signal when the another transmission apparatus switches an optical signal to be received from the first optical signal to the third optical signal.

2. The transmission apparatus according to claim 1, wherein the first output unit generates an optical signal that is the replication of another optical signal, after the output of the first optical signal is stopped.

3. The transmission apparatus according to claim 1, further comprising:
a switch configured to respectively transmit a data signal to the first output unit and the second output unit,
wherein the first output unit and the second output unit respectively generate the first optical signal and the third optical signal from the data signal.

4. The transmission apparatus according to claim 1, wherein the second output unit shifts a third wavelength of the third optical signal to a predetermined wavelength.

5. A transmission system comprising:
a first transmission apparatus configured to include
a first output unit configured to generate a first optical signal of which a first wavelength is variable and control the first wavelength to be close to a second wavelength of a second optical signal, the first output unit outputting the first optical signal to another transmission apparatus, and
a second output unit configured to generate a third optical signal that is replication of the first optical signal in a wavelength band opposite to the first wavelength across the second wavelength, the second output unit outputting the third optical signal to the another transmission apparatus; and
a second transmission apparatus configured to include a switch configured to switch an optical signal to be received from the first optical signal to the third optical signal, the another transmission apparatus being the second transmission apparatus,
wherein the first transmission apparatus stops outputting the first optical signal after the third optical signal is outputted to the second transmission apparatus.

6. The transmission system according to claim 5, wherein the first output unit generates an optical signal that is the replication of another optical signal, after the output of the first optical signal is stopped.

7. The transmission system according to claim 5,
wherein the first transmission apparatus further including a switch configured to respectively transmit a data signal to the first output unit and the second output unit, and
wherein the first output unit and the second output unit respectively generate the first optical signal and the third optical signal from the data signal.

8. The transmission system according to claim 5, wherein the second output unit shifts a third wavelength of the third optical signal to a predetermined wavelength.

* * * * *